(12) United States Patent
Wood et al.

(10) Patent No.: US 12,714,092 B2
(45) Date of Patent: Aug. 25, 2026

(54) BOAT HUNTING BLIND INCLUDING A SPRING-LOADED AUTO-LEVELING LEG WITH DUAL ACTION TOP

(71) Applicant: Icon Outdoors, LLC, Olive Branch, MS (US)

(72) Inventors: Tate Wood, Olive Branch, MS (US); Bobby L. Windham, Jr., Olive Branch, MS (US); James L. Spence, Olive Branch, MS (US)

(73) Assignee: Icon Outdoors, LLC, Olive Branch, MS (US)

( * ) Notice: Subject to any disclaimer, the term of this patent is extended or adjusted under 35 U.S.C. 154(b) by 721 days.

(21) Appl. No.: 18/131,907

(22) Filed: Apr. 7, 2023

(65) Prior Publication Data

US 2023/0240282 A1 Aug. 3, 2023

Related U.S. Application Data

(63) Continuation-in-part of application No. 17/112,960, filed on Dec. 4, 2020, now Pat. No. 11,678,655.

(60) Provisional application No. 62/942,229, filed on Dec. 2, 2019.

(51) Int. Cl.

| | |
|---|---|
| ***B63B 17/02*** | (2006.01) |
| ***A01M 31/02*** | (2006.01) |
| ***B63B 35/00*** | (2020.01) |

(52) U.S. Cl.
CPC .......... *A01M 31/025* (2013.01); *B63B 17/02* (2013.01); *B63B 35/00* (2013.01)

(58) Field of Classification Search
CPC ......... B63B 17/00; B63B 17/02; B63B 35/00; A01M 31/025; A01M 31/02
USPC ................................................ 114/351, 361
See application file for complete search history.

(56) References Cited

U.S. PATENT DOCUMENTS

| | | | |
|---|---|---|---|
| 3,323,530 | A | 6/1967 | Smith |
| 4,070,722 | A | 1/1978 | Sutherland |
| 5,458,079 | A | 10/1995 | Matthews et al. |
| 5,615,633 | A | 4/1997 | Cripe |
| 6,769,379 | B2 | 8/2004 | Foiles |
| 7,063,035 | B2 | 6/2006 | Belcher |
| 7,401,566 | B1 | 7/2008 | Miknich |
| 9,279,268 | B2 | 3/2016 | Liu |
| 2004/0139906 | A1 | 7/2004 | Dunn |

*Primary Examiner* — Lars A Olson
(74) *Attorney, Agent, or Firm* — Warren D. Schickli; Stites & Harbison PLLC

(57) ABSTRACT

A boat hunting blind includes a skirt frame, a skirt panel carried on the skirt frame, and a blind top frame. The blind top frame includes (a) a first support post and a second support post attached to and projecting from the skirt frame, (b) a first top panel support pivotally mounted to the first support post and the second support post and (c) a second top panel support pivotally mounted to the first support post and the second support post. The boat hunting blind also includes a first top panel carried on the first top panel support and a second top panel carried on the second top panel support.

13 Claims, 21 Drawing Sheets

64
68
66
72
62
50
44
42
70
30
46
76

30
76
42
46
50
70
44
62
20
66
72
64
68

BOAT HUNTING BLIND INCLUDING A SPRING-LOADED AUTO-LEVELING LEG WITH DUAL ACTION TOP

RELATED APPLICATION

This application is a continuation-in-part (CIP) of U.S. patent application Ser. No. 17/112,960, filed on Dec. 4, 2020, which claims the benefit of U.S. Provisional Patent Application Ser. No. 62/942,229, filed on Dec. 2, 2019, which is hereby incorporated by reference in its entirety.

FIELD OF THE DISCLOSURE

The present disclosure relates to blinds for concealing hunters and, more particularly, to a portable hunting blind that may be easily assembled to provide camouflage to enable a hunter to appear as part of the environment during hunting or photographing wildlife and especially on a hunting boat for water-based waterfowl hunting.

BACKGROUND OF THE DISCLOSURE

A hunting blind is a cover device for hunters or gamekeepers, designed to reduce the chance of detection. There are different types of blinds for different situations, such as deer blinds and duck blinds. Some are exceedingly simple, while others are complex. The legality of various kinds of blinds may vary according to season, state and location.

Duck blinds may be stable or mobile. The ground blinds are an alternative to the traditional tree stand. Movements in a well-designed ground blind can virtually be undetectable by the game. The duck blinds also can be quite elaborate and their purpose may often extend beyond concealment to include protection from the elements, particularly from rain and cold. In some areas, the blinds can approach small cabins in their size and amenities. Also, for hunting waterfowl in fields, hunters may use a layout blind. A layout blind is a low profile blind that a person can lay down in and stubble in to hide from waterfowl. Moreover, some blinds may be portable.

This document relates to a new and improved boat blind that is easily assembled and used.

BRIEF SUMMARY OF THE DISCLOSURE

The present disclosure includes a boat hunting blind that can be used on a hunting boat for water-based waterfowl hunting. The boat hunting blind comprises: a skirt frame, a skirt panel carried on the skirt frame, and a blind top frame. The blind top frame includes (a) a first support post and a second support post attached to and projecting from the skirt frame, (b) a first top panel support pivotally mounted to the first support post and the second support post and (c) a second top panel support pivotally mounted to the first support post and the second support post. The boat hunting blind also comprises a first top panel carried on the first top panel support and a second top panel carried on the second top panel support.

In one or more of the many possible embodiments, the skirt frame includes a front frame member, a rear frame member, a left side frame member and a right side frame member connected together to define a four sided frame structure. The skirt frame may also include a plurality of length adjustable legs.

Each leg of the plurality of legs may include a first section, a second section and a center stop bracket. The first section may have a first end pivotally connected to one of the front frame member and the rear frame member and a second end pivotally connected to the center stop bracket. The second section may have a third end pivotally connected to the center stop bracket and a fourth end that is pivotally connected to a foot adapted for mounting to a boat upon which the boat hunting blind is to be used. Still further, in one or more embodiments, the boat hunting blind may include a spring that extends between a corner of the skirt frame and the center stop bracket.

In one or more of the many possible embodiments, the first top panel support is displaceable between a first concealment position, extending from the first and second support posts toward the front frame member, and a first shooting position, extending back over the first and second support posts. In one or more of the many possible embodiments, the second top panel support is displaceable between a second concealment position, extending from the first and second support posts toward the rear frame member, and a second shooting position, extending back over the first and second support posts.

In accordance with yet another aspect, a boat hunting blind comprises a skirt frame having a plurality of sides and a plurality of legs wherein each leg of said plurality of legs includes (a) a first section, (b) a second section and (c) a center stop bracket. The center stop bracket is adapted to pivotally connect to both the first section and said second section. The boat hunting blind also includes a blind top frame carried on the skirt frame.

In one or more embodiments, the blind top frame includes a first support post and a second support post attached to and projecting from the skirt frame. Further, the blind top frame may include a first top panel support pivotally mounted to the first support post and the second support post. Still further, the blind top frame may include a second top panel support pivotally mounted to the first support post and the second support post.

The boat hunting blind may also include a series of panels to provide concealment for the hunters within the blind. Those panels may include a skirt panel carried on the skirt frame, a first top panel carried on the first top panel support and/or a second top panel carried on the second top panel support.

In one or more of the many possible embodiments of the boat hunting blind, the first section of each leg has a first end pivotally connected to one of said plurality of sides and a second end pivotally connected to the center stop bracket. The second section of each leg may have a third end pivotally connected to the center stop bracket and a fourth end having a foot adapted for mounting to a boat. Still further, a spring extends between a corner of the skirt frame and the center stop bracket of each leg.

In at least one embodiment, the first top panel support is displaceable between a first concealment position, extending from the first and second support posts toward one of the sides, and a first shooting position, extending upward and back over the first and second support posts. In at least one embodiment, the second top panel support is displaceable between a second concealment position, extending from the first and second support posts toward another of the sides, and a second shooting position, extending upward and back over the first and second support posts.

In order to achieve to overcome the limitations here stated, the present invention provides a boat hunting blind for concealing a hunter. The skirt frame length and width are adjustable to allow for mounting to boats of different sizes. The boat hunting blind has a portable and modular construction and a weight sufficiently light for a hunter to carry into a boat for assembling into the blind for a hunting trip. However, the hunter may install the presently disclosed boat hunting blind to a boat and retain it until after the season. The boat hunting blind remains on the boat until after the season, where it can be quickly removed freeing up to use the boat for fishing The see-through mesh top allows the hunters to lean away from the front opening of the blind, beneath the see-through top and look upwards, without being detected by the waterfowl. It also allows the hunters to keep eyes on what the ducks are doing. The blind top acts like a mesh overhanging on the top edges and adds further concealment. This presents an advantage that a hunter can tie the mesh and create an unencumbered see through opening.

The at least one blind top panel allows it to be thrown up and behind the hunters. Because of this feature, hunters never lose visual track of the birds.

According to one aspect of the presently disclosed subject matter, there is provided an improved boat hunting blind as herein described.

In view of the above, it is an object of the present invention to provide a boat hunting blind, which can be mounted on a boat to aid hunters in hunting game, particularly waterfowl.

It is another object of the present invention to provide a boat hunting blind that can be quickly and easily collapsed or detached for transport or storage, which allows a hunter to view game/waterfowl and shoot from within the boat hunting blind.

It is another object of the present invention to provide a boat hunting blind that allows the hunters to use the entire front to back and end to end at the top of the boat hunting blind for spotting birds/waterfowl and to be able to throw up the top.

It is another object of the present invention to provide a boat hunting blind including a spring-loaded auto-leveling leg mechanism for lifting the boat hunting blind, with one hand, by grabbing the front and rear panels. Once lifted, the spring-loaded auto-leveling leg mechanism helps to lift the boat hunting blind and when the legs reach vertical position, the springs pull the legs back further until they hit a bracket/stop. Here, gravity pulls down the legs because they are inverted, and it holds the knee joints of the legs firmly against the brace/bracket. When in the locked position, the springs enable both legs to simultaneously lift and lock, unlike known blinds where a hunter has to handle each leg individually when trying to pin/lock the knee, so the blind will stand upright.

Other objects, technical aspects and advantages of the presently disclosed boat hunting blind with simple, reliable, and quick setup and take-down hunting and other outdoor sporting activities will become apparent upon reading the technical description appearing below.

BRIEF DESCRIPTION OF THE DRAWING FIGURES

The present subject matter will now be described in detail with reference to the drawings, which are provided as illustrative examples of the subject matter so as to enable those skilled in the art to practice the subject matter. It will be noted that throughout the appended drawings, like features are identified by like reference numerals. Notably, the FIGUREs and examples are not meant to limit the scope of the present subject matter to a single embodiment, but other embodiments are possible by way of interchange of some or all of the described or illustrated elements and, further, wherein:

FIG. 1 shows an elevated perspective view of a boat hunting blind of the present disclosure;

FIG. 2 provides an elevated perspective view of a skeletal frame of the boat hunting blind;

DETAILED DESCRIPTION OF ILLUSTRATIVE EMBODIMENTS

The detailed description set forth below in connection with the appended drawings is intended as a description of exemplary embodiments in which the presently disclosed subject matter can be practiced. The term “exemplary” used throughout this description means “serving as an example, instance, or illustration,” and should not necessarily be construed as preferred or advantageous over other embodiments. The detailed description includes specific details for providing a thorough understanding of the presently disclosed method and system. However, it will be apparent to those skilled in the art that the presently disclosed subject matter may be practiced without these specific details. In some instances, well-known structures and devices are shown in functional or conceptual diagram form in order to avoid obscuring the concepts of the presently disclosed boat hunting blind.

In the present specification, an embodiment showing a singular component should not be considered limiting. Rather, the subject matter preferably encompasses other embodiments including a plurality of the same component, and vice-versa, unless explicitly stated otherwise herein. Moreover, the applicant does not intend for any term in the specification or claims to be ascribed an uncommon or special meaning unless explicitly set forth as such. Further, the present subject matter encompasses present and future known equivalents to the known components referred to herein by way of illustration.

Although the present disclosure provides a description of a boat hunting blind, it should be understood that the description is by way of example only and is not to be construed in a limiting sense. It is to be further understood that numerous changes may arise in the details of the embodiments of this portable and modular hunting blind. It is contemplated that all such changes and additional embodiments are within the spirit and true scope of this disclosure.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Figure 1:
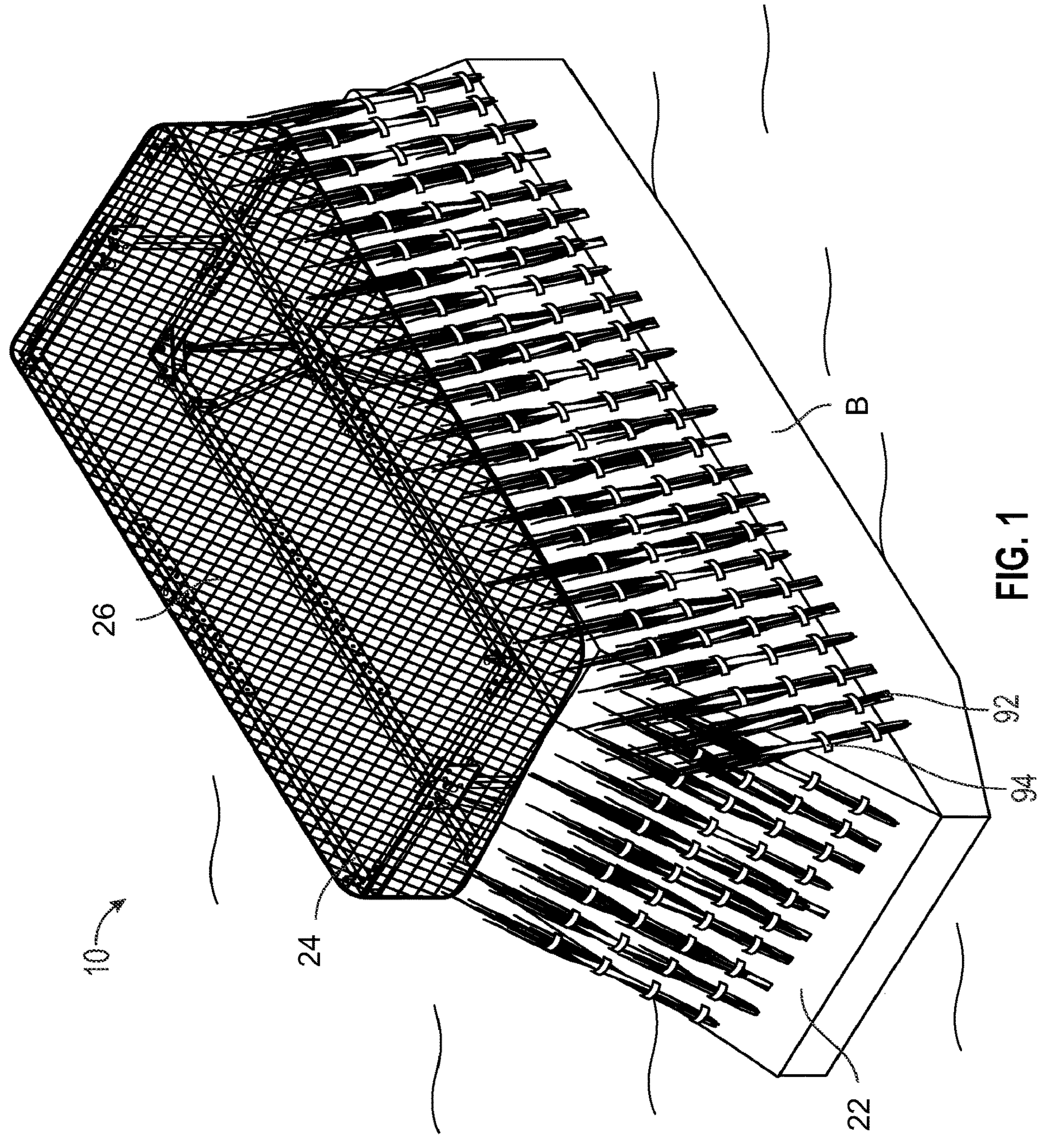
Figure 2:
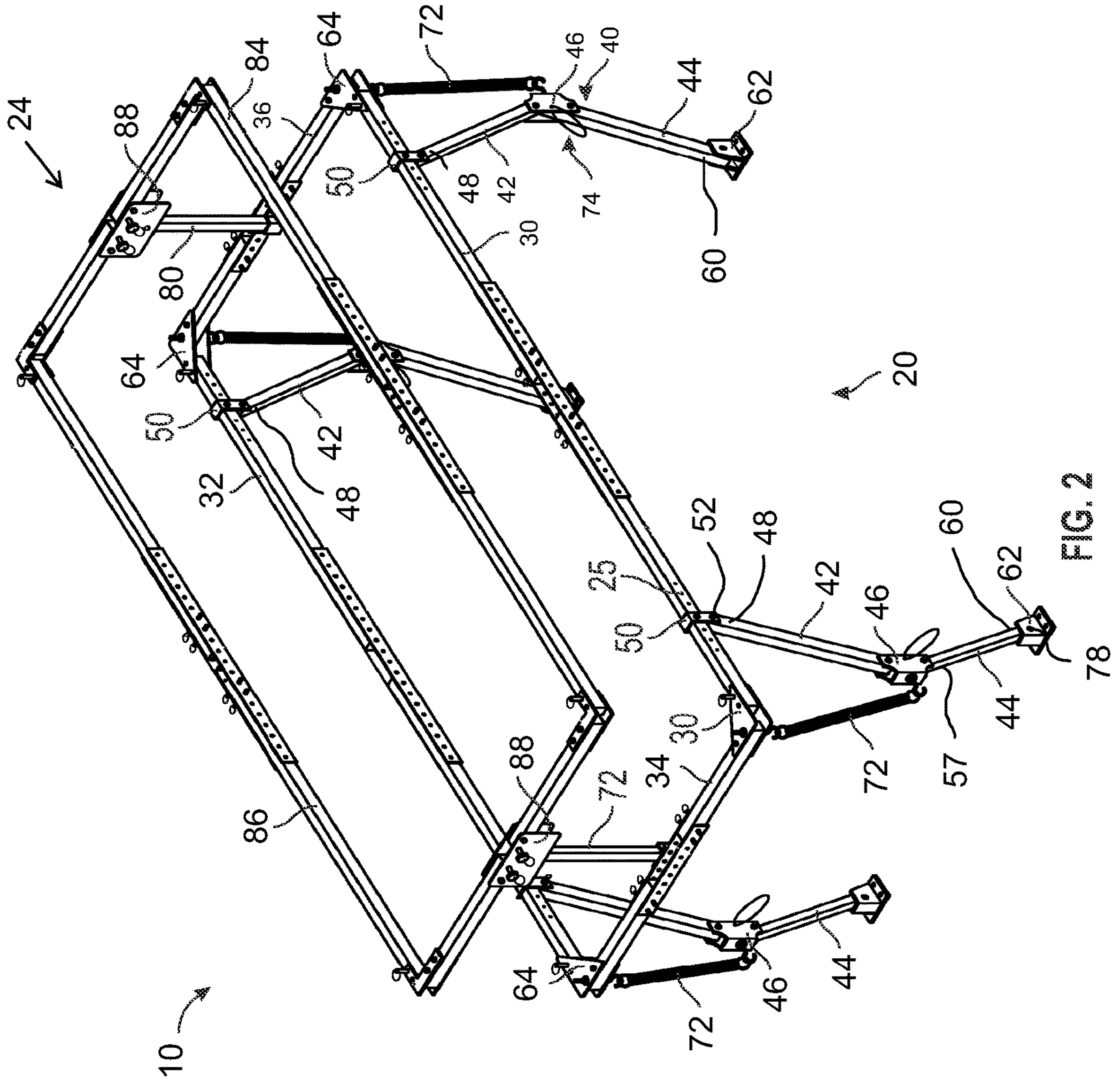
Figure 3A:
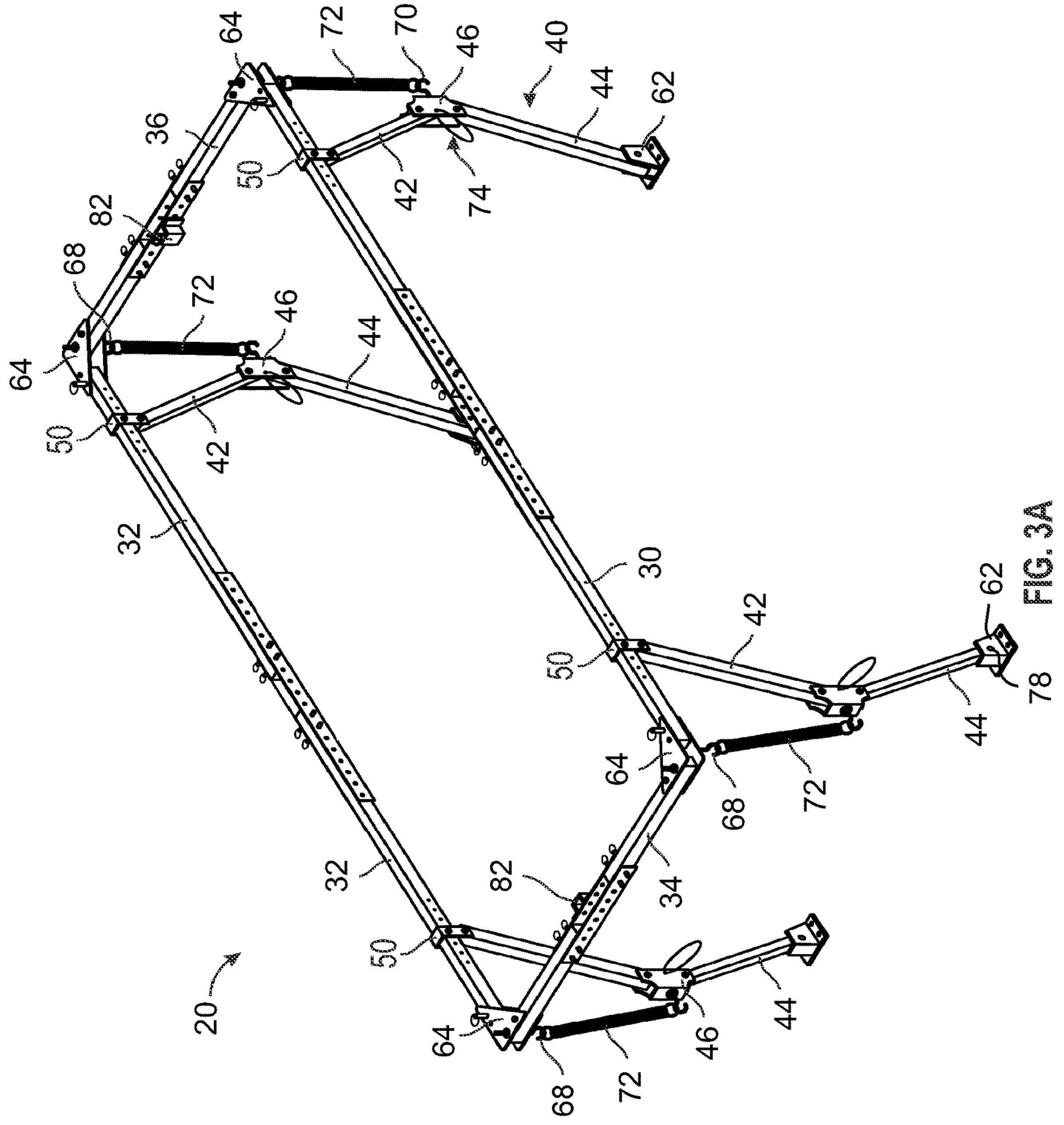
FIGS. 3A and 3B illustrate a perspective and side view, respectively of a blind side panel of the skeletal frame.
Figure 3B:
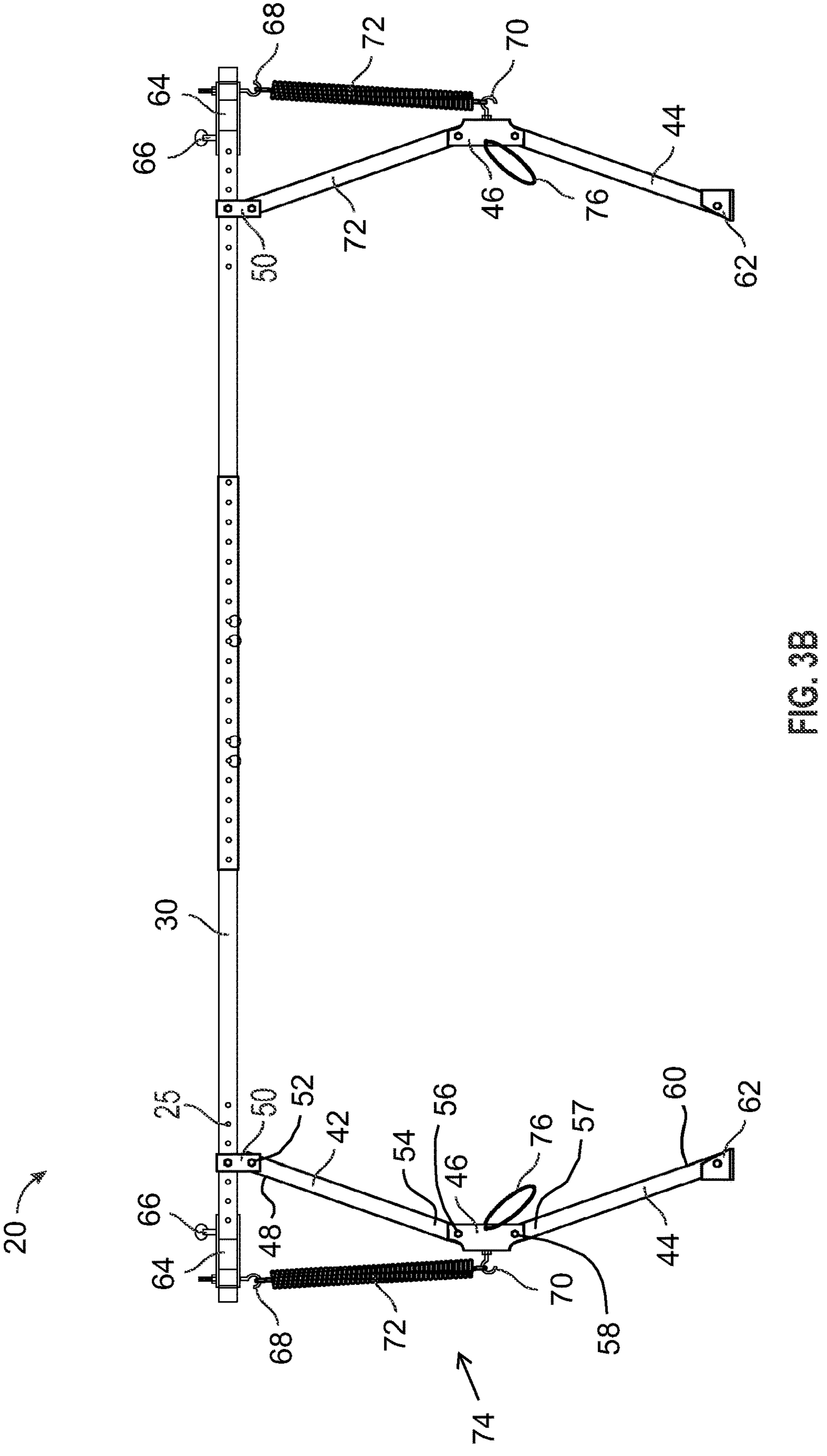
Figure 4B:
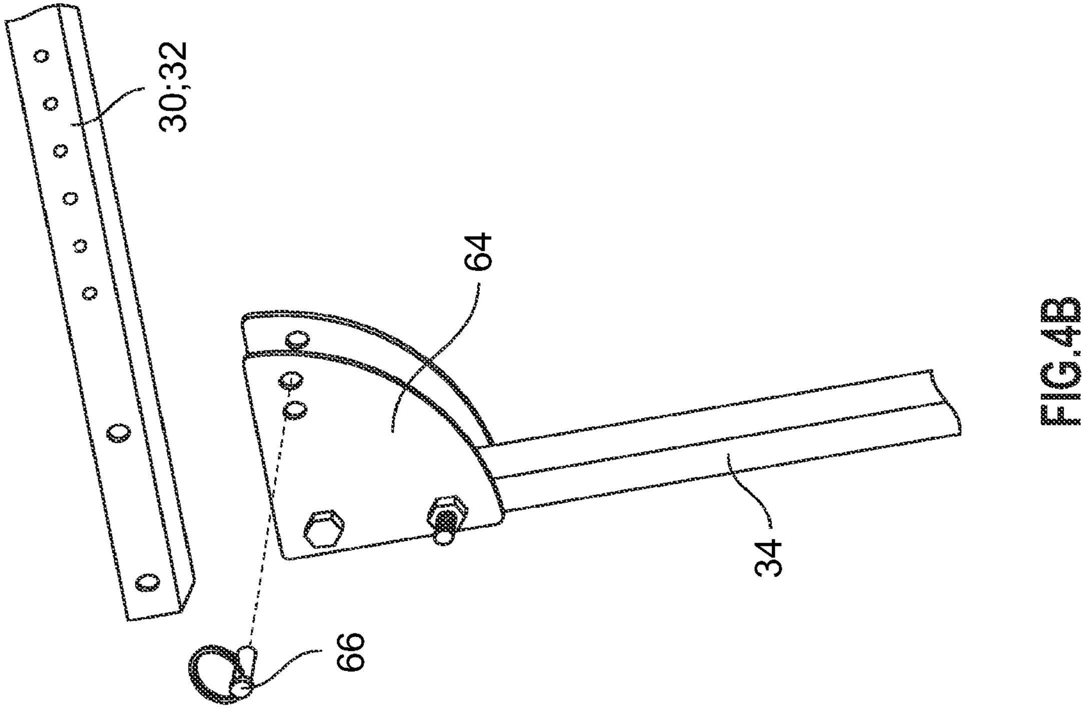
FIGS. 4A and 4B illustrate a corner bracket in installed and uninstalled position, respectively for the boat hunting blind.
Figure 4A:
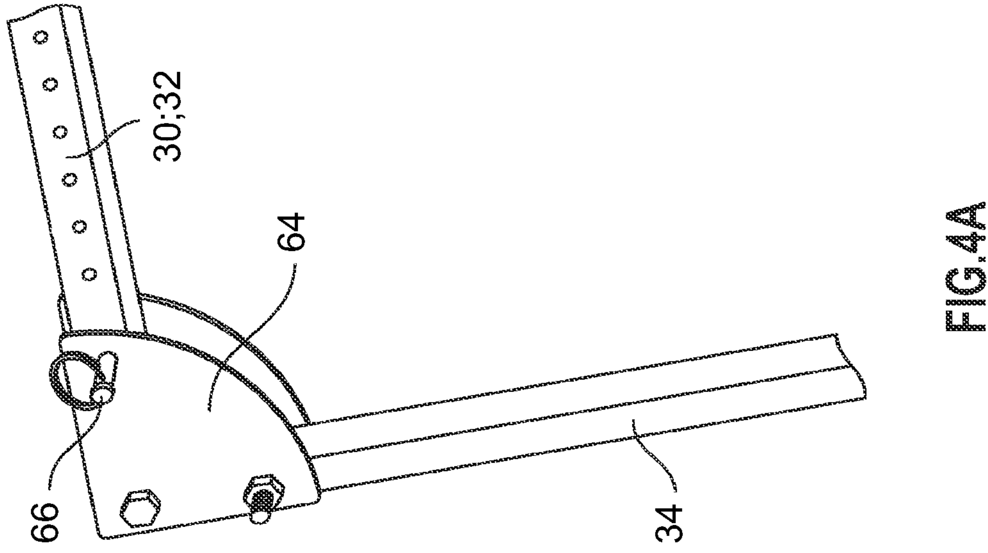
Figure 5:
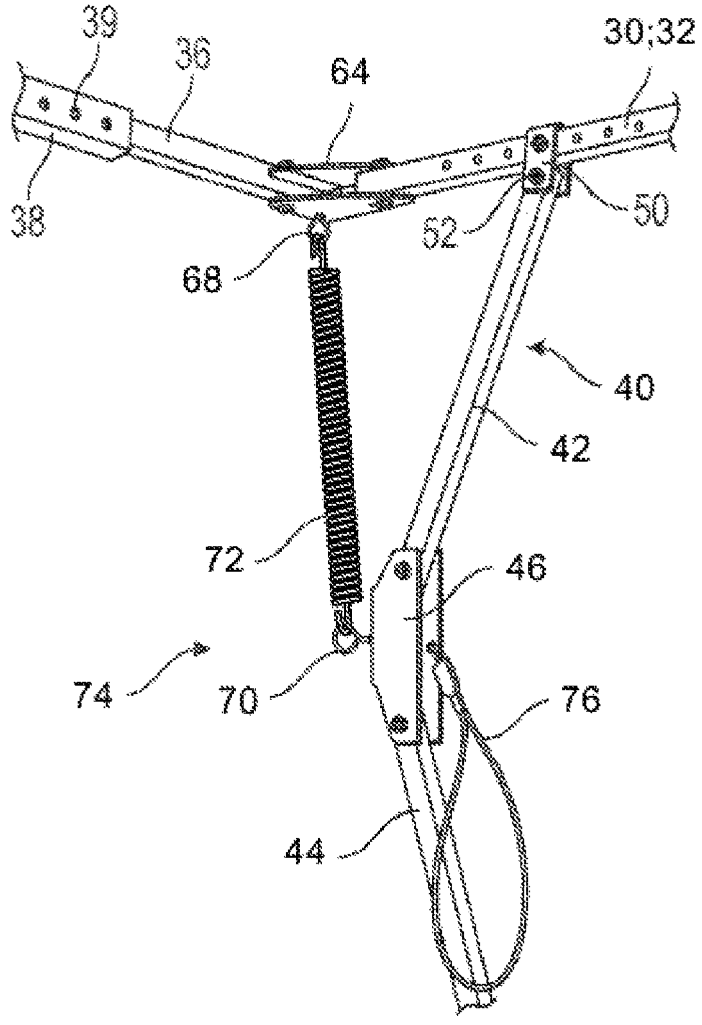
FIGS. 5 and 6 illustrate a leg including a blind collapsing mechanism for adjusting height of the boat hunting blind.

For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-9B, a boat hunting blind 10 includes a skirt frame 20, a skirt panel 22 carried on the skirt frame, a blind top frame 24 and a top panel 26.

The skirt frame 20 of the illustrated embodiment includes a plurality of sides: that is a front frame member 30, a rear frame member 32, a right frame member 34 and a left frame member 36. It should be understood that the front frame member 30, the rear frame member 32, the right frame member 34 and the left frame member 36 form sides of the boat hunting blind 10.

The skirt frame member 20 also includes a plurality of legs 40. Each of those legs 40 includes a first section 42, a second section 44 and a center stop bracket 46. The first section 42 has a first end 48, pivotally connected by bracket 50 and cooperating pivot pin 52 to one of the front frame member 30 or rear frame member 32. The first section 42 also has a second end 54, pivotally connected to the center stop bracket 46 by a pivot pin 56. The second section 44 has a third end 57 pivotally connected by pivot pin 58 to the center stop bracket 46 and a fourth end 60 pivotally connected to a foot 62 adapted for securing the boat hunting blind to a boat B.

The four sides of the skirt frame 20: that is, the front frame member 30, the rear frame member 32, the right frame member 34 and the left frame member 36 are secured together at the ends thereof by a plurality of corner brackets 64 and cooperating fasteners 66. Each corner bracket 64 includes a hook 68 and each center stop bracket 46 includes a hook 70. A spring 72, such as a tension spring, extends between the hooks 68 and 70. Together, the two hooks 68, 70 and the spring 72 form a blind collapsing mechanism 74 for each leg 40.

Figure 6:
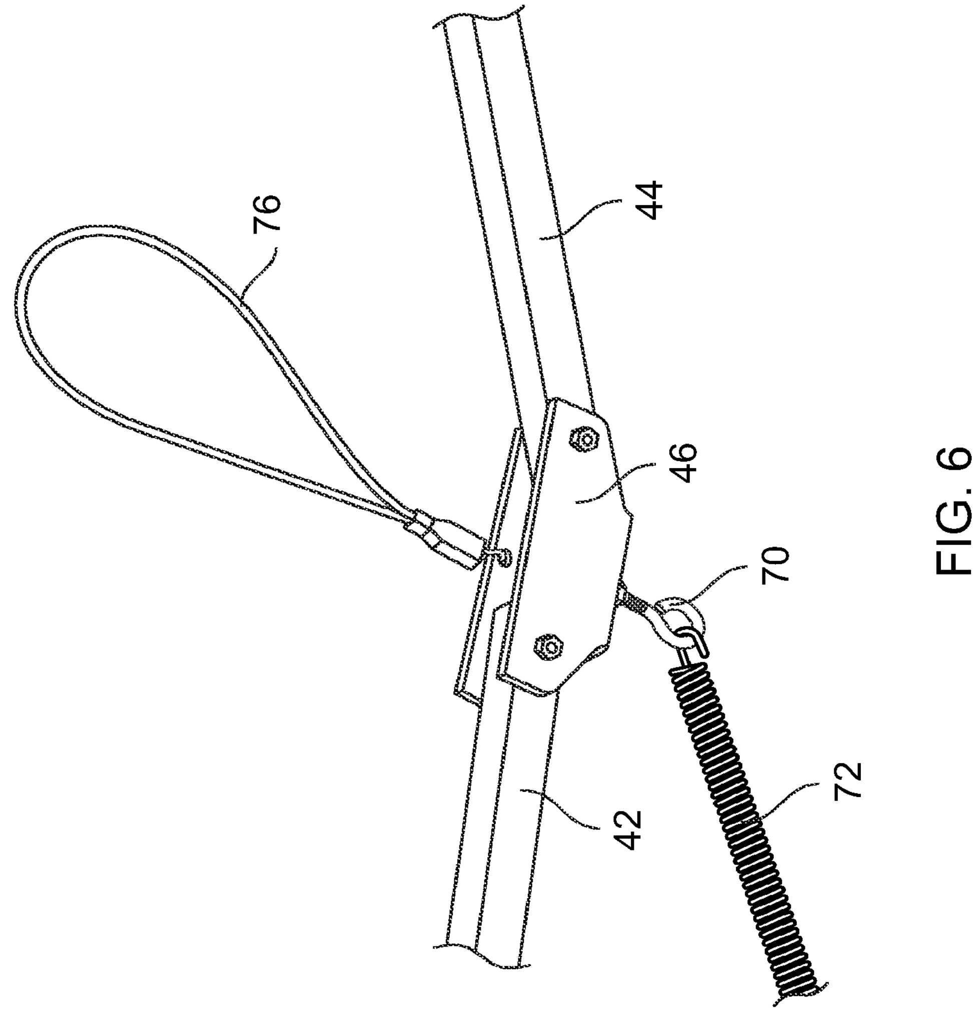

The blind collapsing mechanism 74 also includes a pull wire 76 mounted to the hook 70. It should be understood that a user of the boat hunting blind 10 may hold pull wire 76, as shown in FIG. 6, to pull down the front frame member 30 and/or the rear frame member 32 towards the ground with the help of the spring 72, thereby collapsing the boat hunting blind 10 to the down position. It should be understood that when blind collapsing mechanism 74 is operated/pulled down, each leg 40 including the first section 42 and the second section 44 pivots at center stop bracket 46 and pulls down the corner brackets 64 and the frame members 30, 32, 34 and 36 connected thereto towards the ground. In other words, the user pulls pull wire 76 of the two legs 40 connected to the front frame member 30 to lower the front frame member. Similarly, the user pulls the pull wire 76 of the two legs 40 connected to the rear frame member 32 to lower the rear frame member. If one desires to lower either the right side member 34 or the left side member 36, one pulls the pull wires 76 of the legs 40 provided adjacent the right side member or the left side member. Here it should be appreciated that each frame member 30, 32,34 and 36 may be independently lowered or may be lowered together.

When a user desires to increase or raise the height of the front frame member 30, the rear frame member 32, the right side member 34 or the left side member 36, the user lifts front frame member, the rear frame member, the right side member or the left side member in the center and the legs 40 on that end. Here, the user lifts them together due to independent spring action of each leg 40. This results in the springs 72 being released such that the legs 40 are made to come to an upright or released position.

Figure 12:
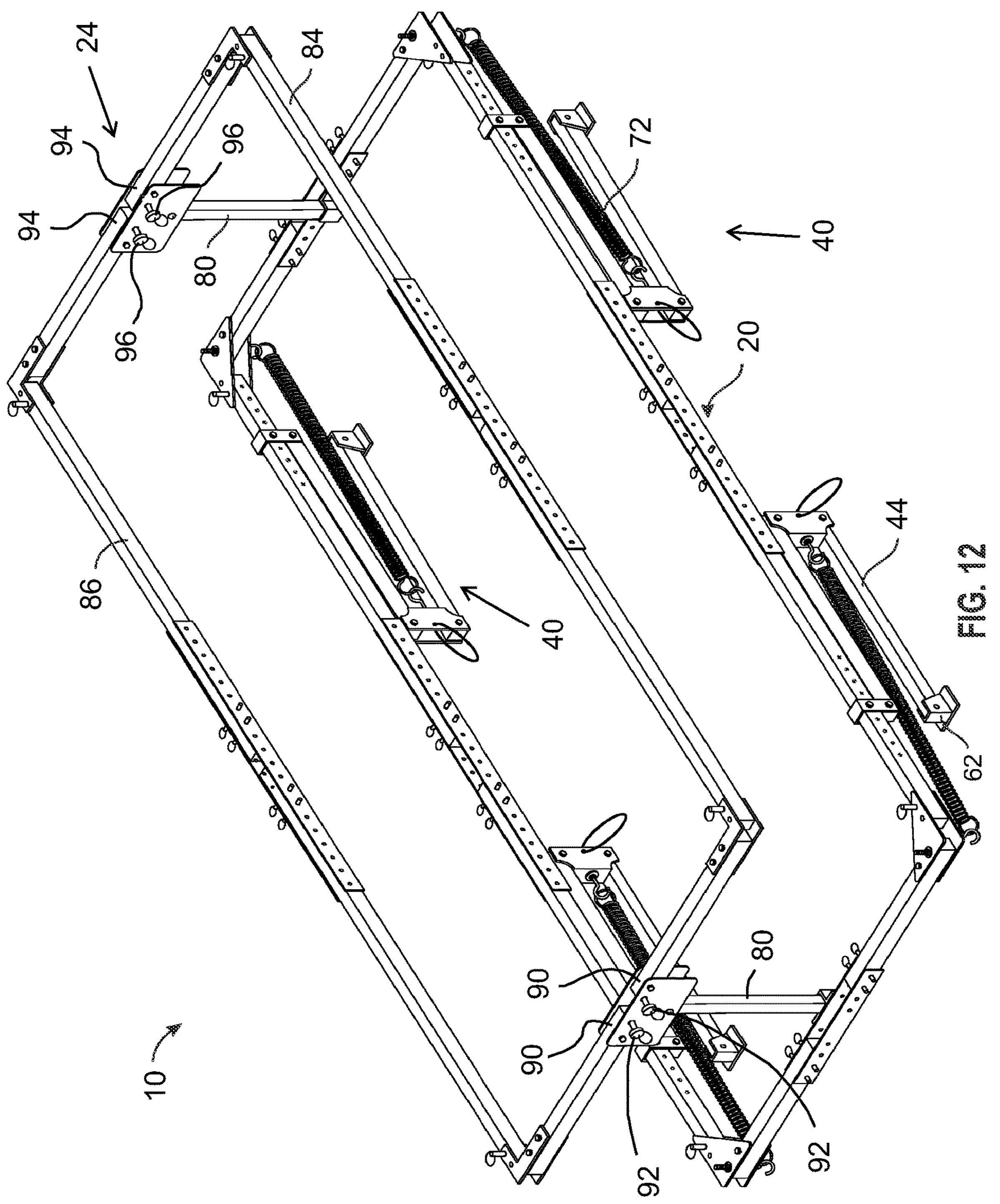
FIG. 12 illustrates the blind side panel in collapsed position while retaining the blind top panel over it.

Thus, it should be appreciated that the springs 72 allow the hunter to grab the front or rear frame members 30, 32 at the center and lift. The hunter does not have to handle each leg 40 like most known blinds. Springs 72 engage and help the hunter to lift the skirt frame 20 up. The springs 72 pull the center stop brackets 46 outwards towards the right frame member 34 or the left frame member 36 whichever is most adjacent. The legs 40 hit the center stop bracket 48 and the force/pull of the spring 72 tends to hold the legs 40 in place, thus locking the legs 40 with spring force against the stop. The fourth end 60 of the second section 44 is connected to the foot 62 by a pivot pin 78 to allow the folding of the legs 40 while the foot is secured to the boat B. By having spring 72 on both sides, when the hunter lifts in the center of the rear or front frame members 30, 32, the legs 40 lift simultaneously and lock in the up position. To lower the skirt frame 20 to the down position, there are two pull wires 76, at each end of the blind, attached to each leg's center stop bracket 48. The hunter grabs the pull wires 76 at the same time and pulls both legs 40 to lower them simultaneously (FIGS. 9B and 12).

Figure 7A:
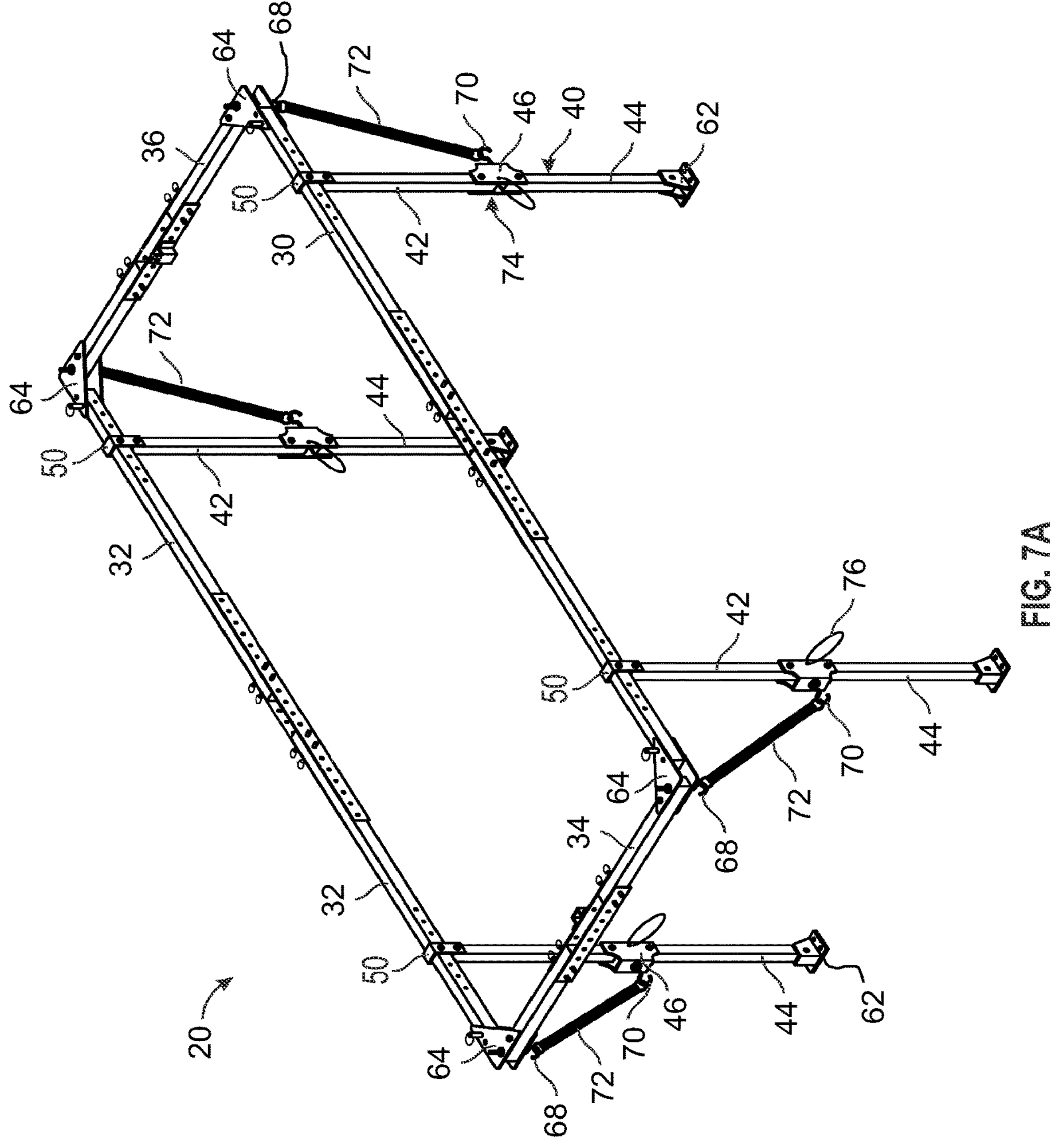
FIGS. 7A, 7B, 8A, 8B, 9A and 9B show various perspective and side views of the blind side panel in which the legs are operated to position the blind side panel at various height from the ground or surface.
Figure 7B:
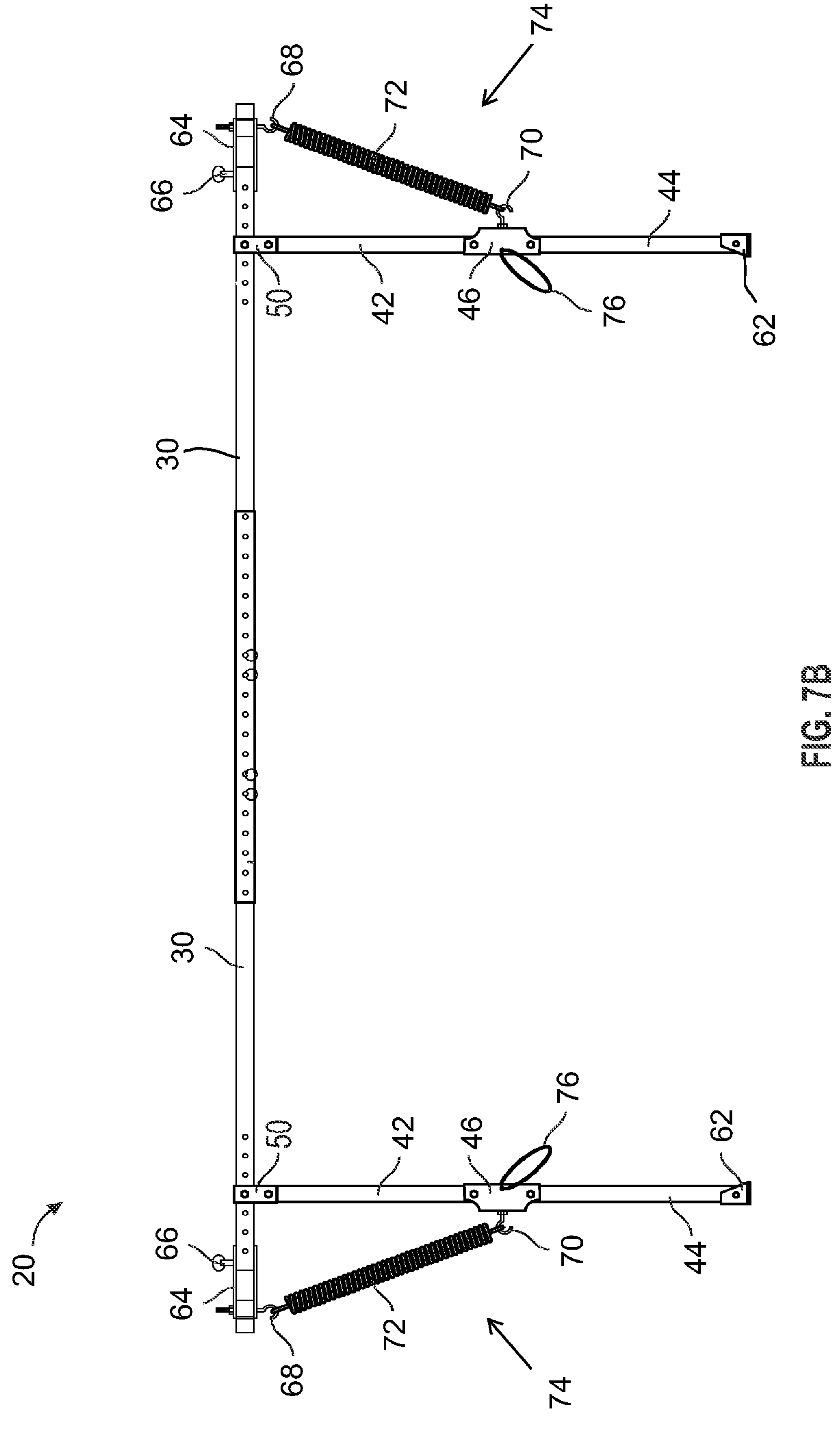
Figure 8A:
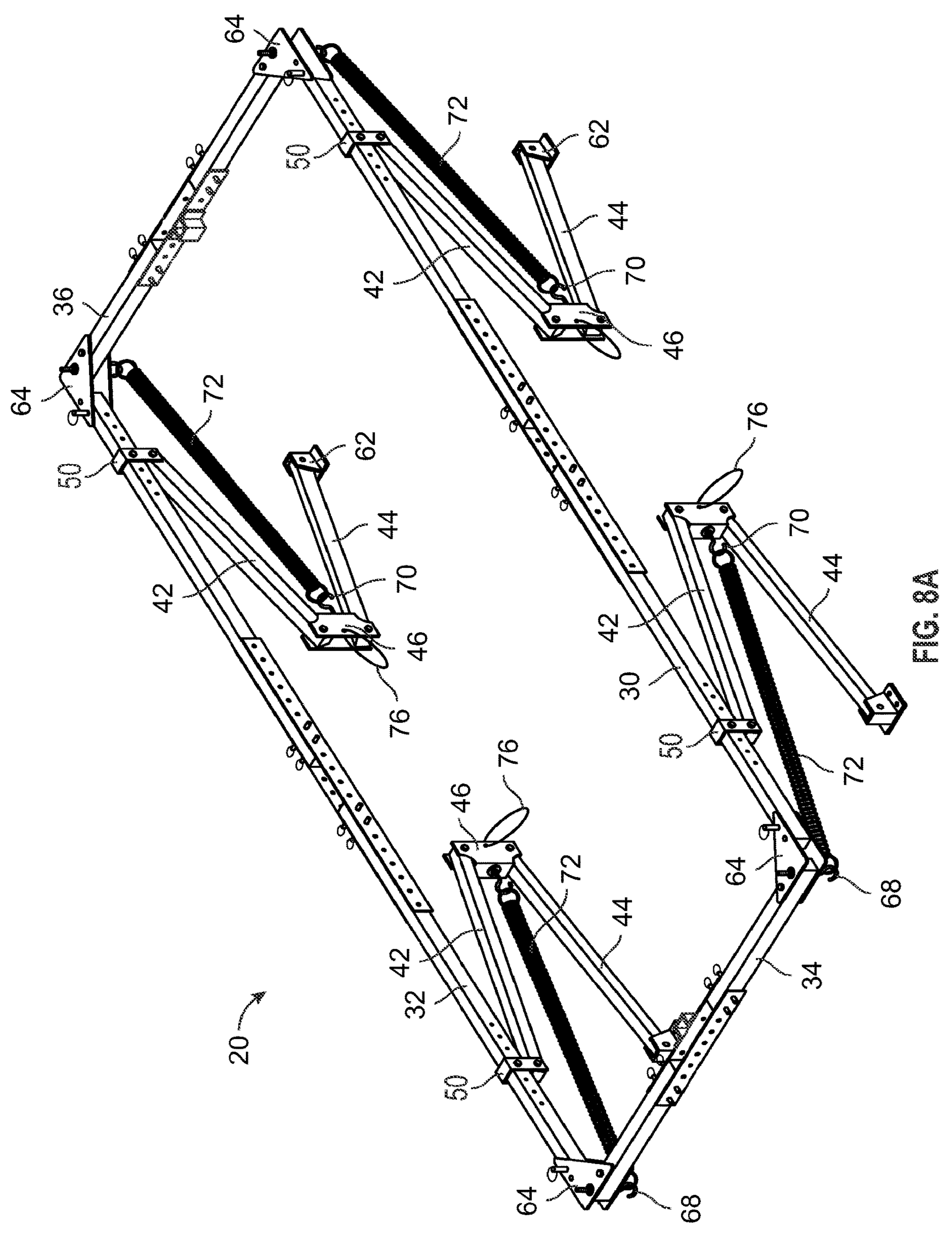
Figure 8B:
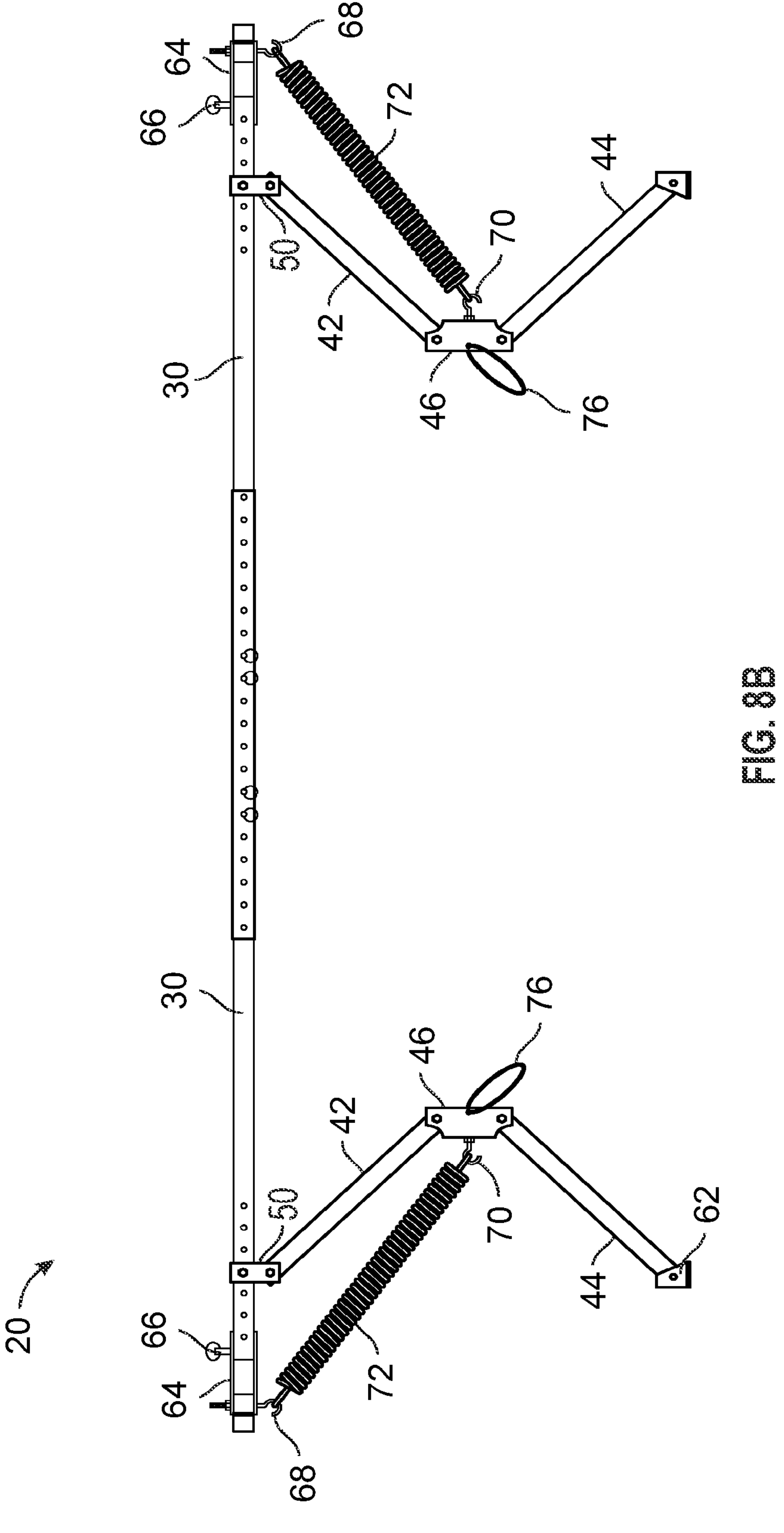
Figure 9A:
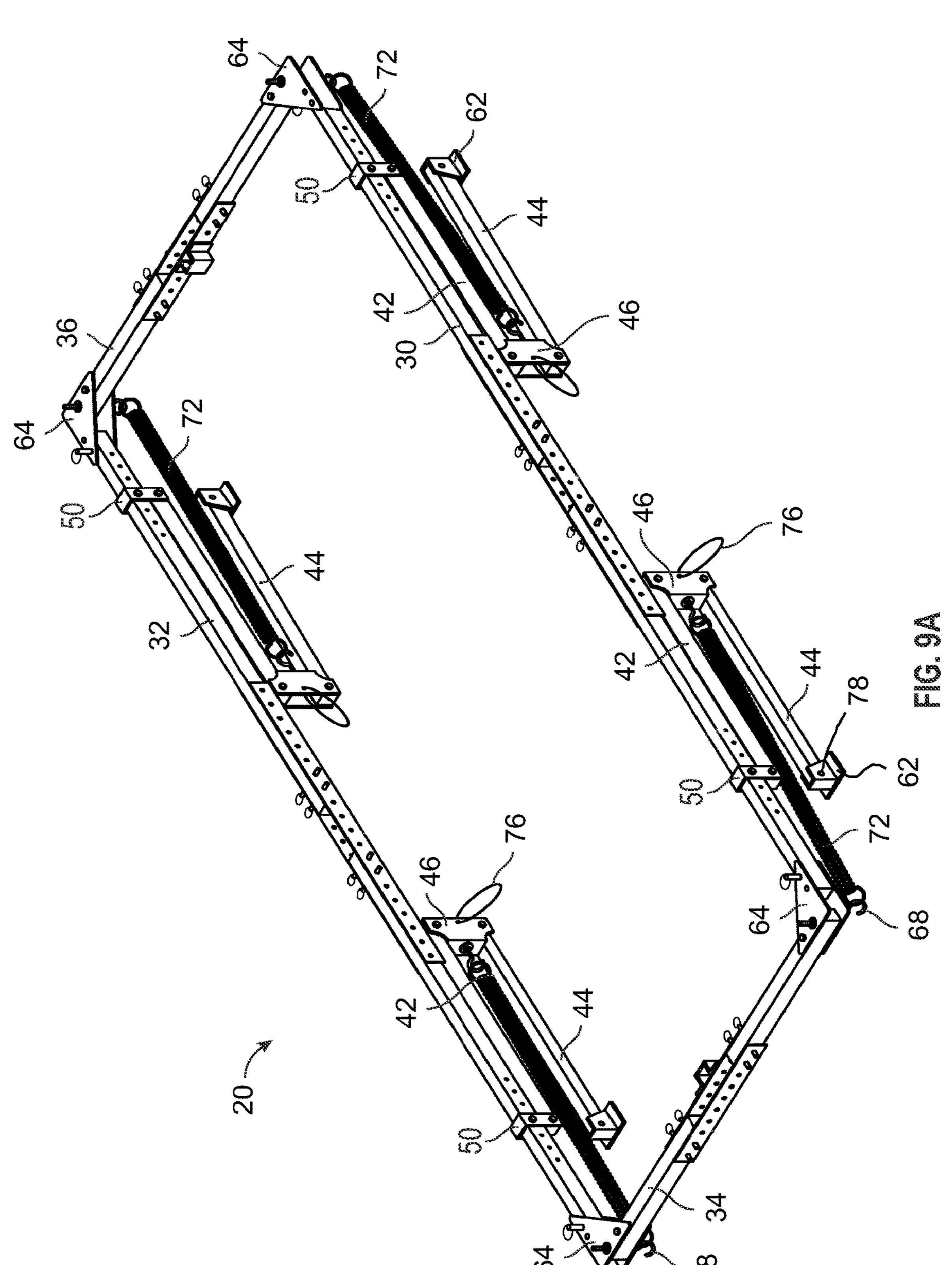
Figure 9B:
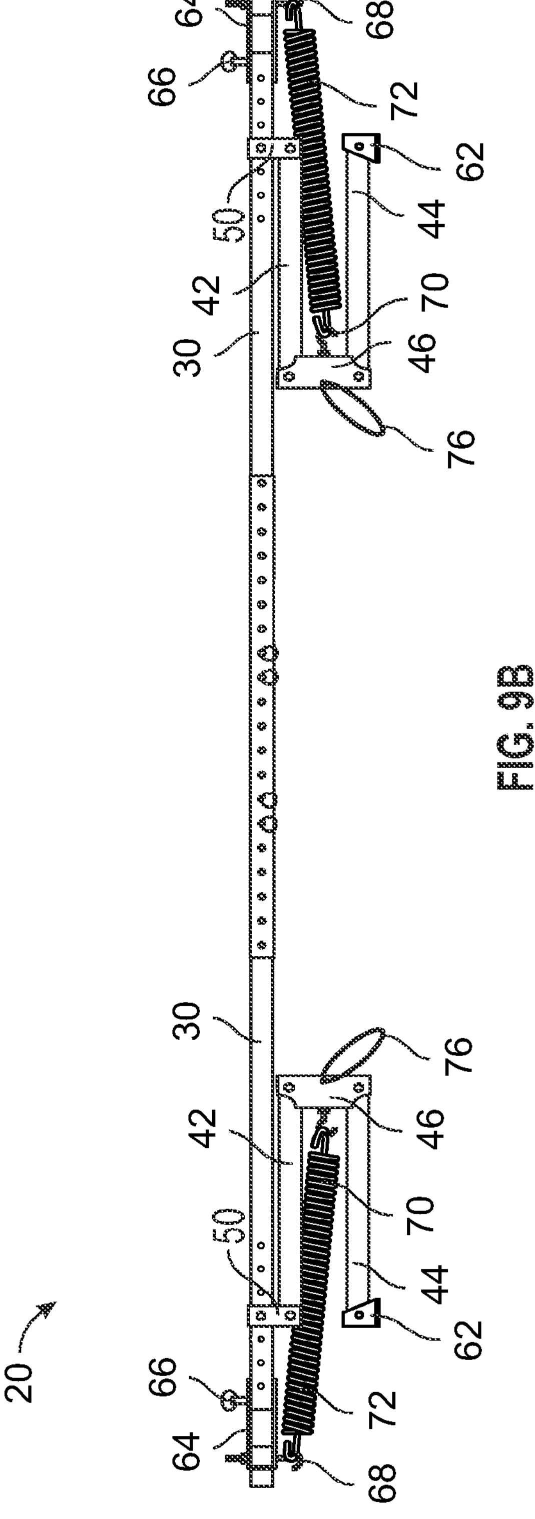

FIGS. 7A to 9B show various perspective and side views of skirt frame 20 in which legs 40 are operated to position the skirt frame 20 from collapsed position to upright position. It should be understood that FIGS. 7A and 7B show a perspective and a side view of the skirt frame 20 in which legs 40 are positioned in upright position. FIGS. 8A and 8B show a perspective and a side view of the skirt frame 20 in which legs 40 are bent/collapsed partially thereby reducing the height as compared to height shown in FIGS. 7A and 7B. As specified above, the user may operate blind collapsing mechanism 74 to adjust the height of skirt frame 20 around the boat B. FIGS. 9A and 9B show the skirt frame 20 in fully a collapsed position.

Figure 10B:
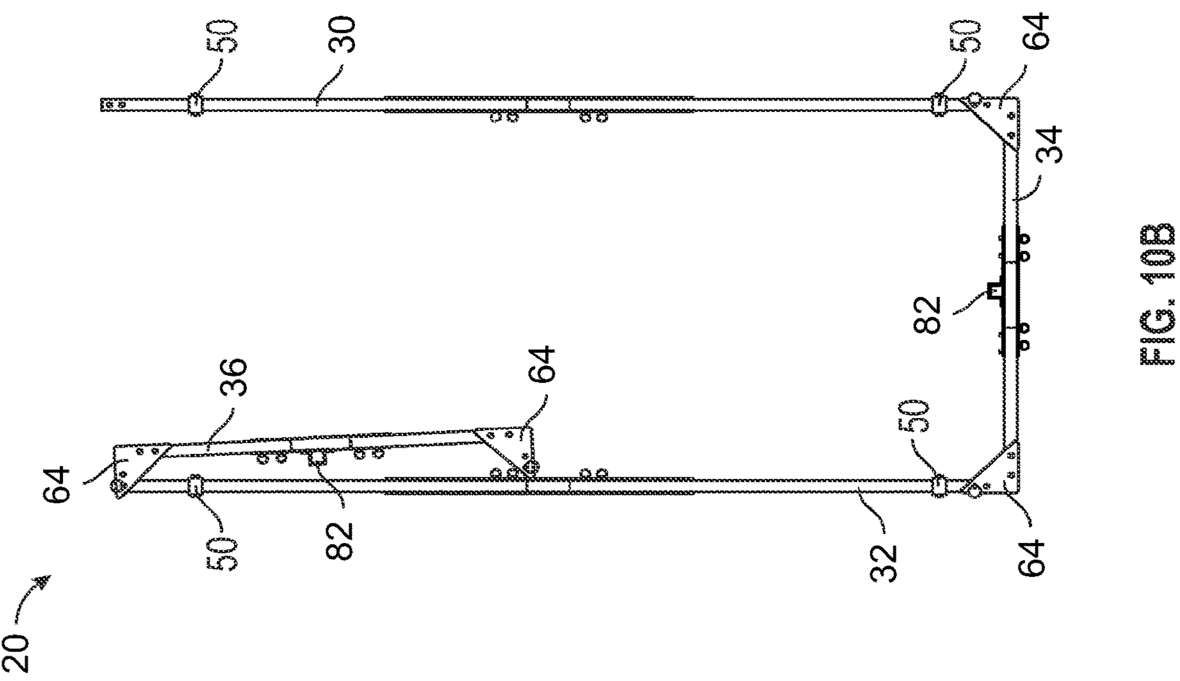
FIGS. 10A and 10B illustrate top views of the blind side panel showing an aspect of installing and uninstalling an end panel from a front panel while being mounted to a rear panel.
Figure 10A:
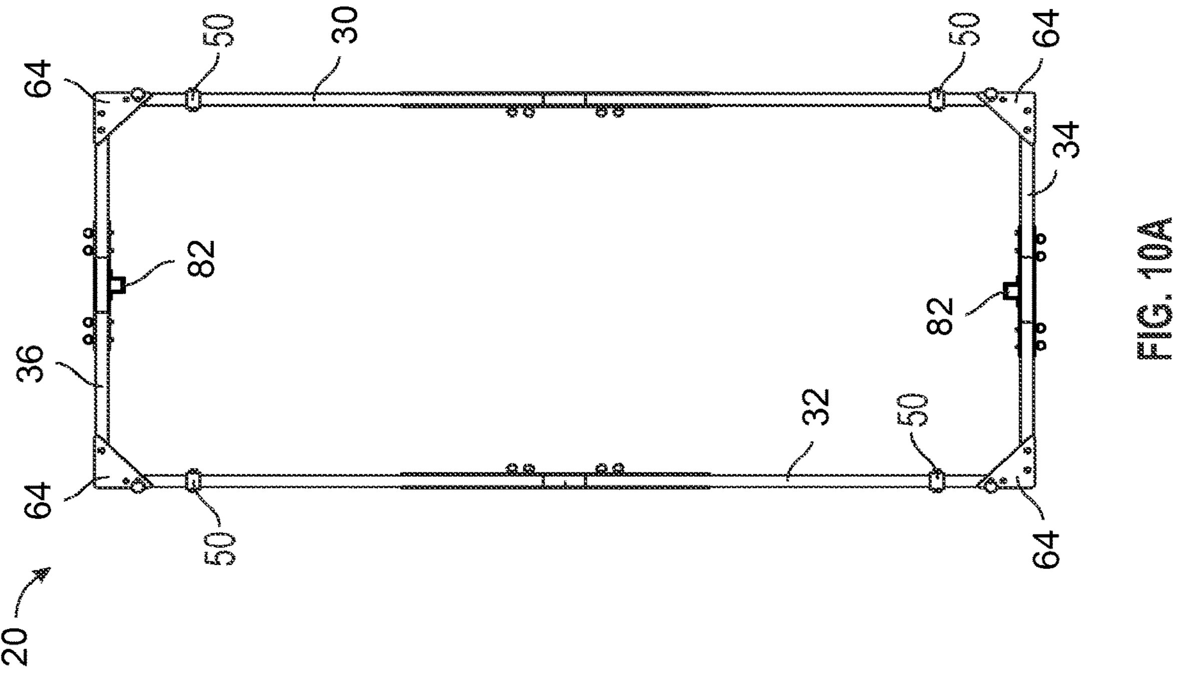

Now referring to FIGS. 10A and 10B, top views of the skirt frame 20 illustrating a feature of uninstalling left frame member 36 from front frame member 30 while being mounted to the rear frame member 32 is shown. Specifically, FIG. 10A shows the top view of the skirt frame 20 in which the left frame member 36 is mounted to front frame member 30. FIG. 10B shows the left frame member 36 disconnected from the front frame member 30 while being mounted to rear frame member 32. Here, removing the fastener 66 from the end of the left frame member and the corner bracket 64 allows one to rotate or pivot the left frame member to the side. This allows one to provide clearance for a boat motor M or the like.

Similarly the right frame member 34 may be uninstalled from the front frame member 30 and folded. By uninstalling both the right and left frame members 34, 36, the skirt frame 20 can be easily folded and transported when not in use thereby saving space.

Referring back to FIG. 2, blind top frame 24 includes first and second support posts 80 adapted to attach the blind top frame to the skirt frame 20. More particularly, one support post 80 is secured to the right frame member 34 and one support post is secured to the left frame member 36 at the receivers 82 carried on the right and left frame members. The blind top frame 24 also includes a first top panel support 84 and a second top panel support 86. The first and second top panel supports 84, 86 are both substantially U-shaped. Each top panel support 84, 86 may be made from a single piece of material or constructed from three interconnected pieces of material as shown in the illustrated embodiment.

Each support post 80 includes a mounting bracket 88 adapted for pivotally connecting the top panel supports 84, 86 to the support posts 80. More particularly, each top panel support 84, 86 includes a first end 90 pivotally attached to the support post 80 carried on the right frame member 34 by a pivot pin 92 received in the mounting bracket 88 carried on that support post. Similarly, each top panel support 84, 86 includes a second end 94 pivotally attached to the support post 80 carried on the left frame member 36 by a pivot pin 96 received in the mounting bracket 88 carried on that support post. The top panel 26 is carried on the two top panel supports 84, 86.

In one possible embodiment, the support posts 80 may be provided with holes (not shown) such that the height that the top panel supports 84, 86 project above the skirt frame 20 may be adjusted. In order to facilitate height adjustment, a pin (not shown) may be inserted into the hole of the support posts 70 and the receivers 82.

Figure 11:
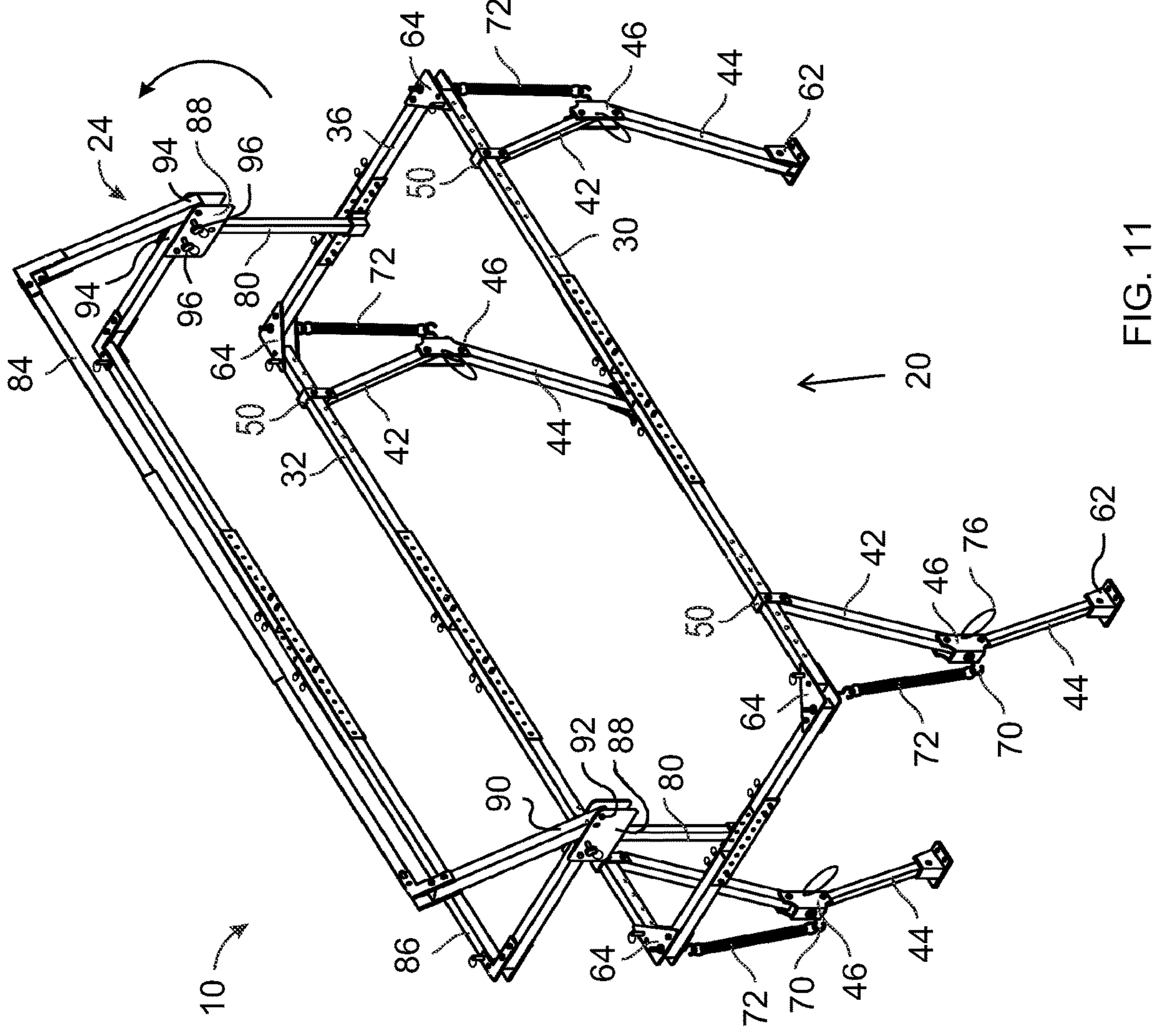
FIG. 11 illustrates an aspect of the presently disclosed boat hunting blind including the ability to fold back the blind top panel.

Top panel support 84 functions as a front top panel and top panel support 86 functions as a rear top panel, effectively forming one dual-action top with the top panel 26. As such, the front top panel support 84 can be thrown back towards rear top panel support 86, or vice versa. FIG. 11 shows the first or front top panel support 84 thrown back over the second or rear top panel support 86. Similarly, the second or rear top panel support 86 can be thrown back over the first or front top panel support 84. FIG. 12 shows a feature of the skirt frame 20 in the collapsed position while retaining the blind top frame 24 over it.

The boat hunting blind 10 further includes a skirt 90 depending around the skirt frame 20 so to envelope skeletal frame 20, as shown in FIG. 1. Skirt 90 indicates a fabric that acts as a wind blocker. As such, skirt 90 may also be referred as wind blocker. Skirt 90 may be made from a waterproof and/or windproof material. At the outside, skirt 90 includes brushes 92 that are tied to it with the help of a plurality of brush straps 94. In one example, a plurality of brush straps 94 are sewn into the skirt 90. Alternatively, a plurality of brush straps 94 are attached to the skirt 90 using other known mechanisms. As noted above, the boat hunting blind 10 further includes a blind top panel 26 that mounts over the top panel supports 84, 86. Blind top panel 26 may be made from a see-through mesh for permitting a hunter to see flying game while concealing the hunter behind blind top panel.

Figure 13:
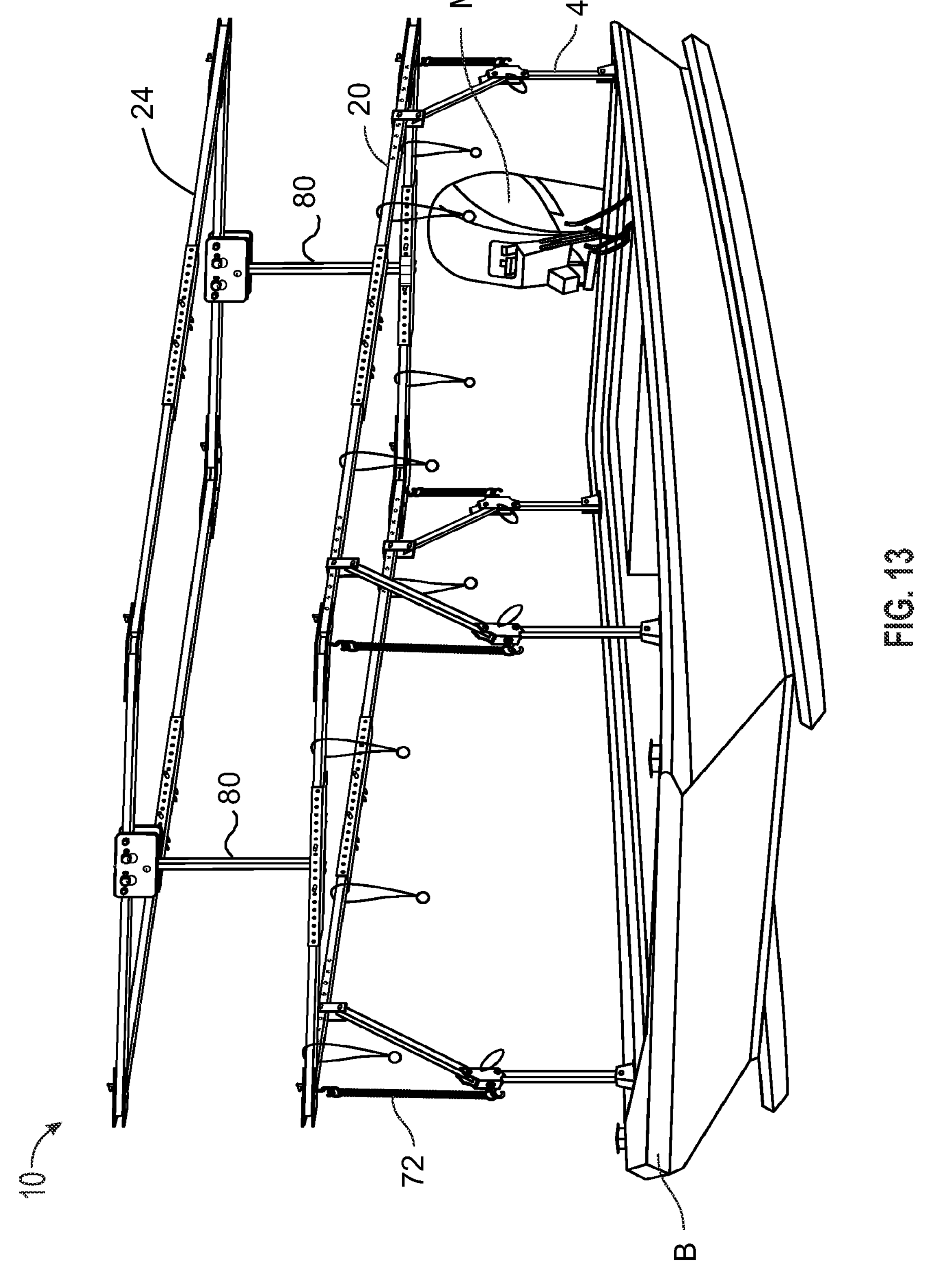
FIG. 13 illustrates a feature of mounting the skeletal frame to a boat, in accordance with one embodiment of the present disclosure.
Figure 14:
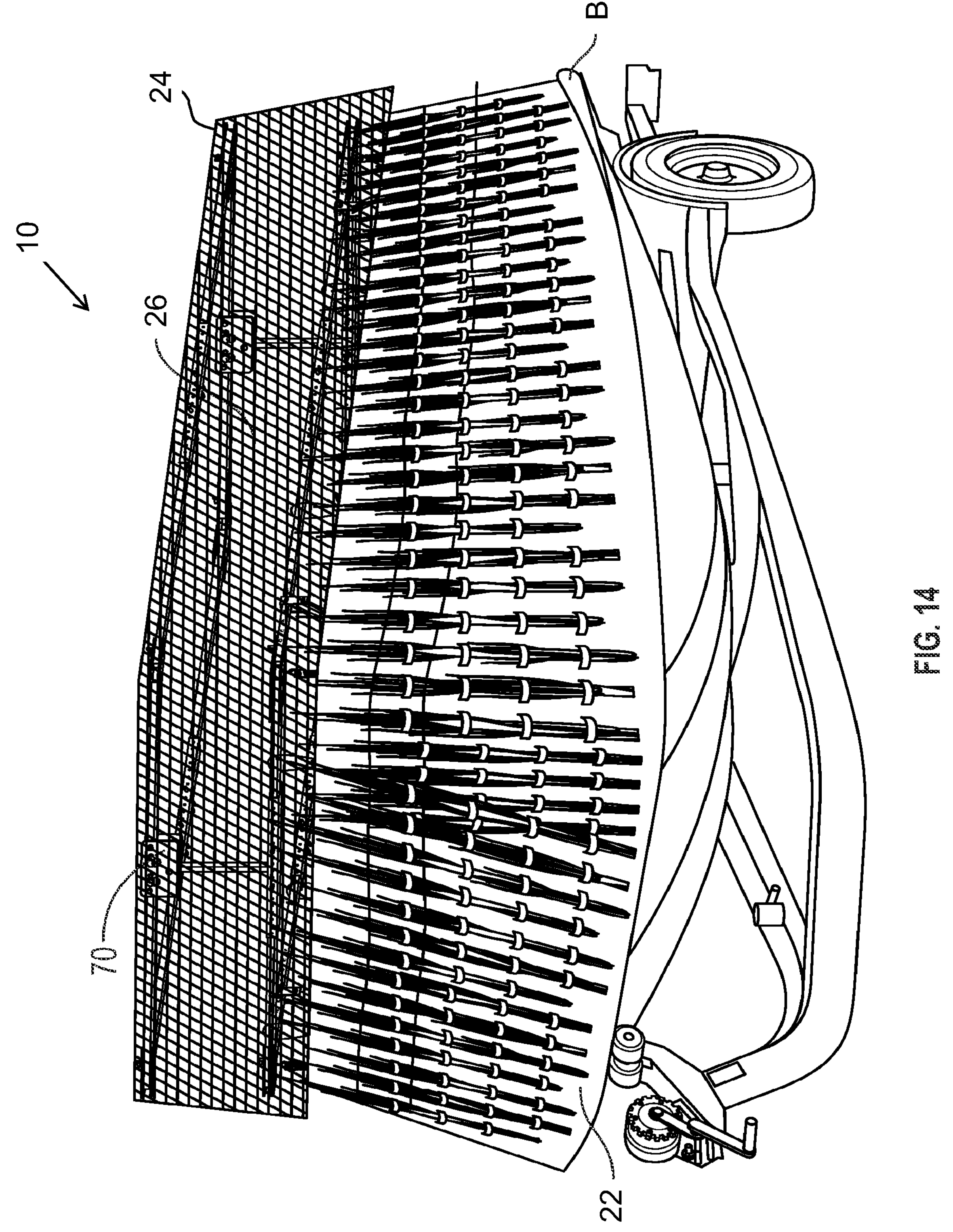
FIG. 14 illustrates a feature of mounting the boat hunting blind on the boat.

As specified above, the boat hunting blind 10 is adapted for mounting on a boat B. In order to mount on a boat B, at first, a hunter mounts skirt frame 20 on a boat B as shown in FIG. 13. Specifically, the hunter mounts feet 62 to boat B using an appropriate fastener of a type known in the art. In one example, the hunter H mounts right side 16 closer to a motor M in boat B. The hunter adjusts the length and width of the frame members 30, 32, 34, 36 of the skirt frame 20 by a length adjustment system (set forth and described in detail in parent U.S. patent application Ser. No. 17/112,960, filed on Dec. 4, 2020 hereby incorporated by reference in its entirety) depending on the length of boat B or as needed. Subsequently, the hunter H envelopes the skirt 22 around the skirt frame 20 and places the blind top 26 on the top panel supports 84, 86 as shown in FIG. 14.

Figure 15:
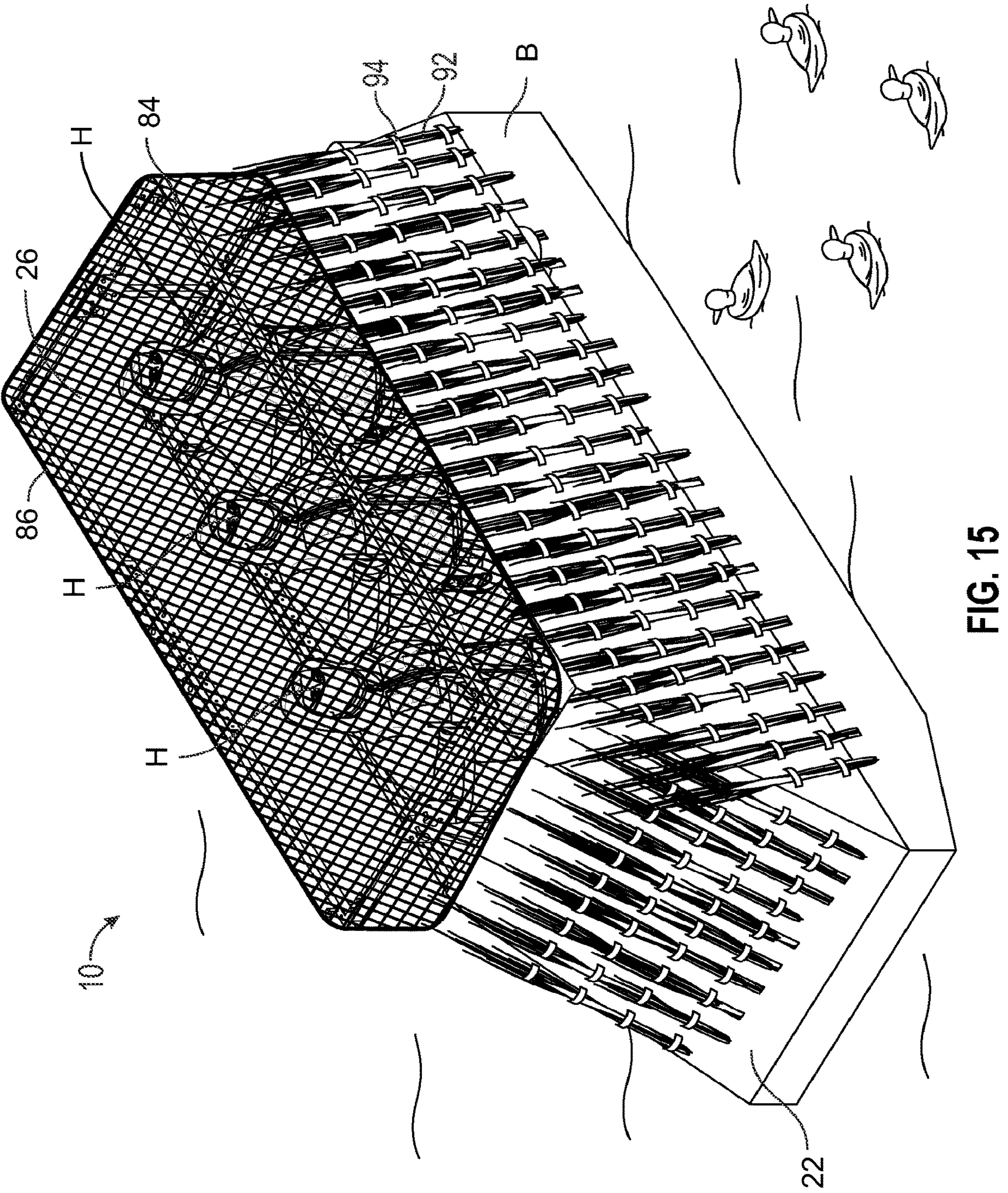
FIG. 15 shows a feature of hunters sitting inside the boat hunting blind.
Figure 16:
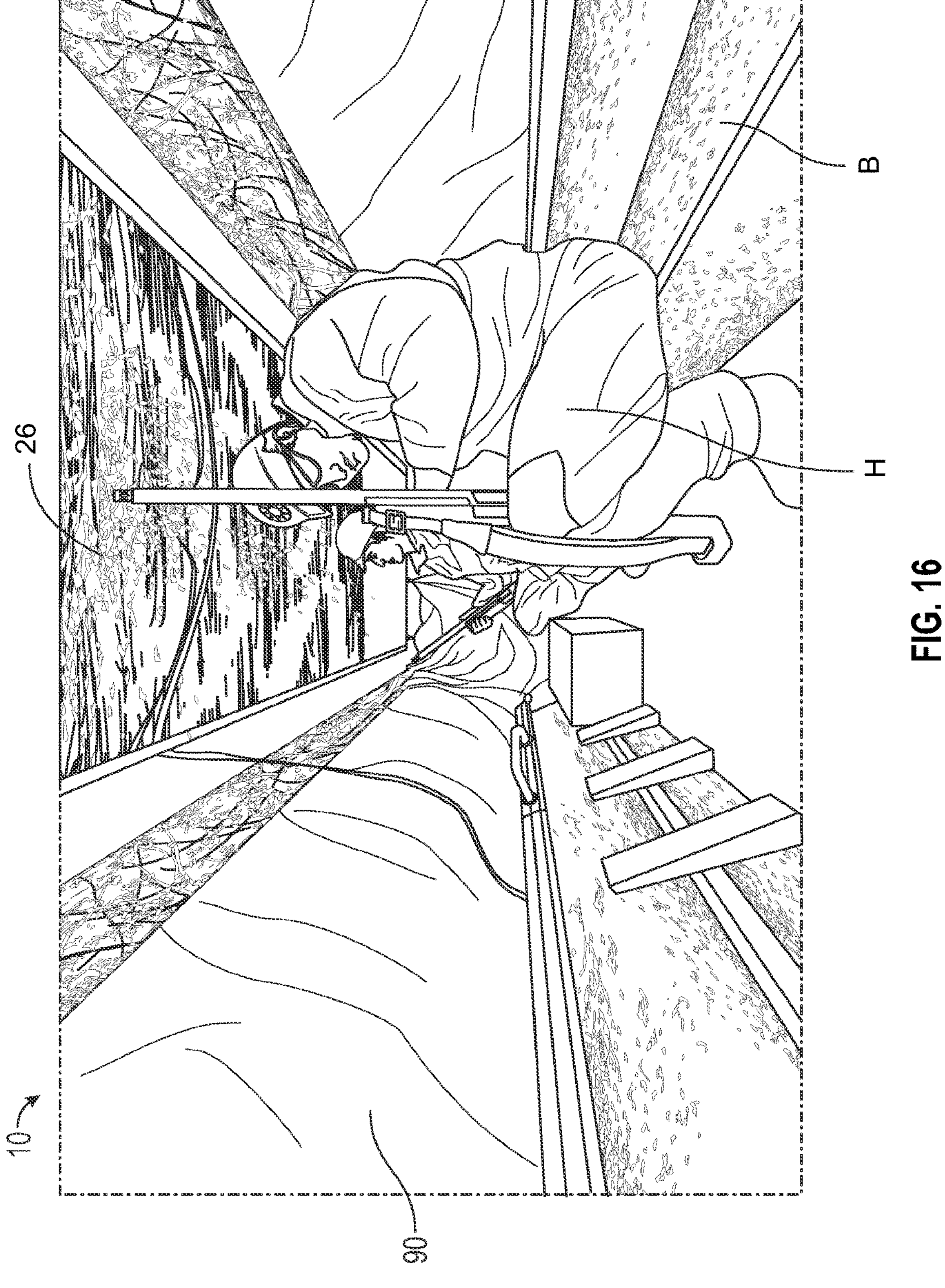
FIG. 16 shows exemplary inner view of the boat hunting blind in which hunters tie up the blind top to achieve an unobstructed view.

In operation, one or more hunters H sit inside boat hunting blind 10 and maneuver boat B closer to game G. FIG. 15 shows a feature of hunters H sitting inside boat hunting blind 10, in accordance with one embodiment of the present disclosure. FIG. 16 shows an inner view of boat B wherein the hunters H are seated on the boat B.

In one implementation, brushes 92 are tied around the edges of blind top panel 26 for camouflaging boat hunting blind 10 in a shallow field or lake environment thereby creating a more natural look. Brush straps 94 breakup the hard edges of the gap formed between blind side panel 22 and blind top panel 26, and make boat hunting blind 10 look more natural, while allowing the hunters to look 360-degrees unencumbered, all while still having a top directly overhead.

The skirt 22 suspends, blocks the wind and provides concealment. It should be understood that skirt frame 20 together with skirt 22 interconnect to provide a camouflaged wall perimeter for concealing the hunter H from flying or land-based game during a hunt. The wind blocking functions of the skirt 22 deliver 360-degree wind protection and concealment. In other words, skirt 22 when put around the skirt frame 20 forms a wind wall. Further, blind top 26 conceals the hunter H inside (FIG. 15), but also allows some visibility when birds are directly overhead.

In another embodiment, the blind top panel supports 84, 86 are fully adjusted, from top down such that no gap exists between blind top panel supports 84, 86 (and the blind top 26) and the skirt 22, and the hunter 102 always looks through the blind top 26 for spotting game G. Similarly, the blind top panel supports 84, 86 may be raised for creating an open-air gap between the blind top panel supports (and the blind top 26) and skirt frame 20 (and the skirt panel 22) for allowing hunters H to spot game H from far distance.

In use, blind top panel 26 is directly overhead where most hunters H flare/spook the birds when they are directly overhead. The gap allows the hunters to see birds off in the distance. The further off in the distance are the birds the more difficult it is to gauge how far they actually are if they're looking through blind top panel 26. As the birds or game G approach the boat hunting blind 10, hunters H can lean back beneath blind top panel 26, when the birds are directly overhead. The hunters H can turn and follow the birds G without spooking the birds. This greatly enhances all hunters' enjoyment, because watching birds in-flight provides some of the most enjoyable aspects of the wildlife hunting experience.

Blind top panel 26 uses a see-through mesh that allows the hunters to see out and the birds not to see in. Ducks/geese/waterfowl are constantly looking for predators or inconsistencies in the terrain. Blinds without tops, when combined with the sun, the angle of the sun when hitting the outer wall of the blind, this creates a shadow inside the blind. When birds are overhead, they can see these dark shadows. On top of this, with numerous hunters in the blind, all moving, turning their heads, and trying to follow the birds' flight path. Oftentimes, a guide or lead hunter will instruct their group to keep their heads down. Not all hunters are disciplined or experienced enough to do this properly. It's hard to control the movement when four to six hunters occupy the blind.

Blind top panel 26 of the presently disclosed boat hunting blind 10 eliminates the shadow and the movement problems with known hunting blinds. The result is a better blind that will materially benefit the hunter to achieve a successful hunting experience.

Figure 17:
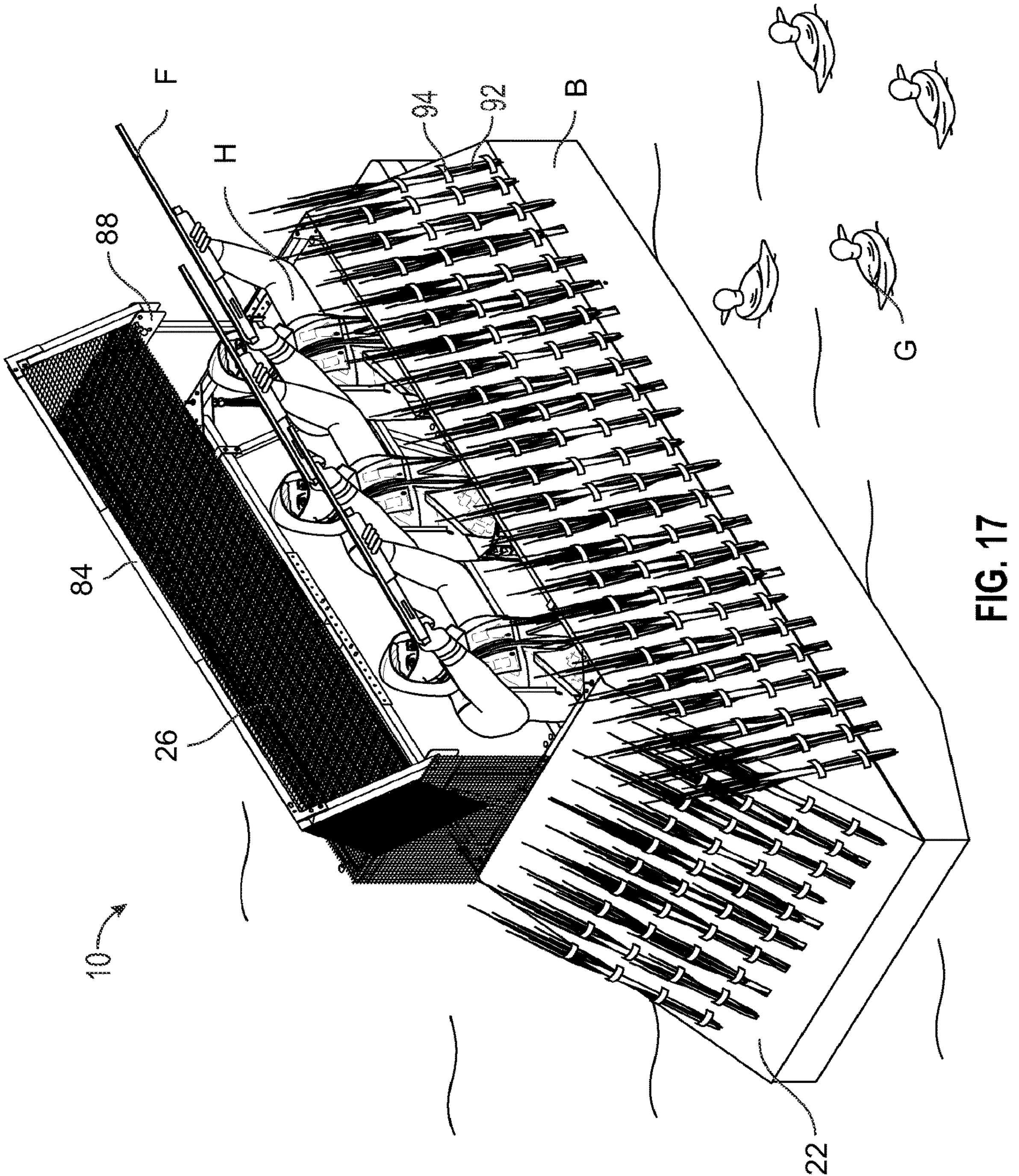
FIG. 17 illustrates a feature in which hunters throwback front top panel and stand to shoot a flying or land-based game.

Also, when birds are about to land, the majority of the time boat hunting blind is positioned where the front of the boat hunting blind is facing where the birds will most likely land based on the wind and the decoy locations. As a result, with the birds not being directly overhead, the hunter can lean forward and see the ducks unencumbered through the gap and hanging brushes. The gap allows the hunter to watch the birds as they approach to land and because the top throws back. In this situation, the hunter may throw back blind top panel support 84 i.e., front top panel 26 without ever losing sight of the birds he is planning to shoot. Similarly, if the hunter H spots a bird G at rear side 14, hunter H may throw back rear top panel support 86 without ever losing sight of the birds G he is planning to shoot. FIG. 17 shows a feature of hunters H using a firearm F to shoot. Here, one or more hunters H throwback front top panel support 84 and stand to shoot the flying or land-based game G using firearm F.

As specified above, blind top panel supports 84, 86 and the blind top panel 26 cover the entire area of boat hunting blind 10, i.e., front to back and end to end. Blind top panel supports 84, 86 pivot from each end to allow only one person to engage blind top panel 80 for all hunters in boat hunting blind 10, instead of multiple tops per hunter. The blind top panel supports 84, 86 of present boat hunting blind 10 open to the rear and front and remain inside the perimeter of boat hunting blind 10, without falling outside boat hunting blind 10 or hunting boat B. Designing the blind top panel supports 84, 86 so they throw behind the hunter H allows the blind top panel supports to open without ever impeding the hunter's view of the birds 106 while shooting. Further, blind top panel 26 along with the blind top panel supports 84, 86 when extended/unfolded fully or thrown back/folded holds its shape.

When either blind top panel support 84, 86 is thrown back, the hunters H may stand and have plenty of room to shoot out the front or the rear. If tall brushes 92 stand against outer wall of skirt 22, then the blind top panel supports 84, 86 and the blind top panel 26 cannot fall outside of skirt 22 because it will hit the brushes 92. Thus, it is preferred to allow the blind top panel supports 84, 86 and the blind top panel 26 to fall onto the front or back half remaining inside the confines of the perimeter to not come in contact with the brushes 92.

In essence, the present invention provides a boat hunting blind including a blind top panel providing end-to-end and front-to-back concealment, that after being engaged and thrown to the front or rear.

The blind top panel pivots from each end to allow only one person to engage the blind top panel for all hunters in the boat hunting blind, instead of multiple blind top panels per hunter. The blind top panel of the present boat hunting blind opens to the rear and front and remains inside the perimeter of the boat hunting blind, without falling outside the boat hunting blind. Designing the blind top panel so it throws behind the hunter allows the blind top panel to open without ever impeding the hunter's view of the birds while shooting.

The presently disclosed boat hunting blind provides full coverage with a wider skirt, as such the shadow of blind top at the front to rear and side to side is eliminated. This is because the blind top covers 100% of the skirt frame beneath it and avoids gap shadow. The brushes or mesh flaps overhand the skirt and allow hunters to shoot out the port or starboard side of the boat.

Left and right or end frame members pivot to either side of the boat. This allows to open up the rear area of the boat and allows the hunter to operate the motor for propelling the boat.

Further, the blind collapsing mechanism at the legs allow blind side panels in position in collapsed position or upright position. This allows hunters to hunt in either collapsed position (FIG. 12) or upright position. The springs allow the hunter to grab the front or rear panels at center and lift. The hunter does not have to handle each leg like most known blinds. The springs engage and help the hunter to lift the skeletal frame up. Each leg has a center stop bracket. The upper and lower legs are attached to the center stop bracket. The spring pulls the center stop bracket (leg bracket) towards the front and rear ends of the blind. The legs hit the center stop and force/pull of the spring to hold the legs in place, thus locking the legs with spring force against the stop. The bottom of the lower leg is connected to the foot, which has an ankle pivot hole allowing the leg to pivot. The upper leg towards the top has a hole which is connected to a u-clip, which is attached to the main side frame of the blind, which allows the top of the upper leg to pivot. By having a spring on both sides of the blind, when the hunter lifts in the center of the rear or front frame, the legs lift simultaneously and lock in the up position. To lower the blind to the down position, there are two pull wires, at each end of the blind, attached to each leg's center stop bracket. The hunter grabs both of them at the same time and pulls both legs to lower them simultaneously.

When the blind is in the collapsed position, the dual-action top can still be positioned to the skirt frame of the blind. The top panel sits above the skirt frame of the blind as much as 10-12". This allows the hunter to sit on the floor of the boat, while still being completely concealed. For example, when hunters are hunting in tall bushes, the boat hunting blind can be concealed while still being in the up position, however, hunters are hunting in an open field, without brush and only have areas where there are short grass or little to no brush, hunters can use this low-profile position to blend in better than the boxy upright position. The lower profile can simulate a shallow spot where grass is able to grow or in a swamp where swamp weed grows on the floor of the swamp. The skirt and blind top can hide the sides and bow of the boat when in the down position. This is another advantage of the presently disclosed boat hunting blind.

The U-channel includes pre-drilled/punched holes which allows hunters to slide adjust the panels, inside the u-channel and quickly set the length and width of the panels. Most blinds require cutting the panels and hunters have to drill additional holes and when they have insert bolts and tighten, it depresses the aluminum against the inner telescoping tubing. When this happens it is very difficult to use the blinds on another boat. The presently disclosed boat hunting blind provides a U-channel having square tubing with pre-drilled holes, which make it fast to customize the blind on the boat. The presently disclosed boat hunting blind allows hunters to quickly remove the blind, adjust the width and length to fit another boat of different size.

In the above description, numerous specific details are set forth such as examples of some embodiments, specific components, devices, methods, in order to provide a thorough understanding of embodiments of the present disclosure. It will be apparent to a person of ordinary skill in the art that these specific details need not be employed, and should not be construed to limit the scope of the disclosure.

In the development of any actual implementation, numerous implementation-specific decisions must be made to achieve the developer's specific goals, such as compliance with system-related and business-related constraints. Such a development effort may be complex and time consuming, but is nevertheless a routine undertaking of design, fabrication, and manufacture for those of ordinary skill. Hence as various changes could be made in the above constructions without departing from the scope of the invention, it is intended that all matter contained in the above description or shown in the accompanying drawings shall be interpreted as illustrative and not in a limiting sense.

The foregoing description of embodiments is provided to enable any person skilled in the art to make and use the subject matter. Various modifications to these embodiments will be readily apparent to those skilled in the art, and the novel principles and subject matter disclosed herein may be applied to other embodiments without the use of the innovative faculty. The claimed subject matter set forth in the claims is not intended to be limited to the embodiments shown herein, but is to be accorded the widest scope consistent with the principles and novel features disclosed herein. It is contemplated that additional embodiments are within the spirit and true scope of the disclosed subject matter.

What is claimed:

1. A boat hunting blind, comprising:

a skirt frame;

a skirt panel carried on the skirt frame;

a blind top frame, the blind top frame including (a) a first support post and a second support post attached to and projecting from the skirt frame, (b) a first top panel support pivotally mounted to the first support post and the second support post and (c) a second top panel support pivotally mounted to the first support post and the second support post;

a first top panel carried on the first top panel support; and a second top panel carried on the second top panel support wherein (i) the skirt frame includes a front frame member, a rear frame member, a left side frame member and a right side frame member connected together to define a four sided frame structure, (ii) the skirt frame further includes a plurality of legs, (iii) each leg of said plurality of legs includes a first section, a second section and a center stop bracket, (iv) the first section has a first end pivotally connected to one of said front frame member and said rear frame member and a second end pivotally connected to the center stop bracket and the second section has a third end pivotally connected to the center stop bracket and a fourth end having a foot adapted for mounting to a boat, (v) a spring extends between a corner of the skirt frame and the center stop bracket.

2. The boat hunting blind of claim 1, wherein the first top panel support is displaceable between a first concealment position, extending from the first and second support posts toward the front frame member, and a first shooting position, extending back over the first and second support posts.

3. The boat hunting blind of claim 2, wherein the second top panel support is displaceable between a second concealment position, extending from the first and second support posts toward the rear frame member, and a second shooting position, extending back over the first and second support posts.

4. A boat hunting blind, comprising:

a skirt frame having a plurality of sides and a plurality of legs wherein each leg of said plurality of legs includes (a) a first section, (b) a second section and (c) a center stop bracket, said center stop bracket being adapted to pivotally connect to both said first section and said second section;

a spring extending between a corner of the skirt frame and the center stop bracket; and a blind top frame carried on the skirt frame wherein the first section has a first end pivotally connected to one of said plurality of sides and a second end pivotally connected to the center stop bracket and the second section has a third end pivotally connected to the center stop bracket and a fourth end having a foot adapted for mounting to a boat.

5. The boat hunting blind of claim 4, wherein the blind top frame includes a first support post and a second support post attached to and projecting from the skirt frame.

6. The boat hunting blind of claim 5, wherein the blind top frame includes a first top panel support pivotally mounted to the first support post and the second support post.

7. The boat hunting blind of claim 6, wherein the blind top frame includes a second top panel support pivotally mounted to the first support post and the second support post.

8. The boat hunting blind of claim 7, further including a skirt panel carried on the skirt frame.

9. The boat hunting blind of claim 8, further including a first top panel carried on the first top panel support and a second top panel carried on the second top panel support.

10. The boat hunting blind of claim 9, wherein the first section has a first end pivotally connected to one of said plurality of sides and a second end pivotally connected to the center stop bracket and the second section has a third end pivotally connected to the center stop bracket and a fourth end having a foot adapted for mounting to a boat.

11. The boat hunting blind of claim 10, wherein the first top panel support is displaceable between a first concealment position, extending from the first and second support posts toward the front frame member, and a first shooting position, extending back over the first and second support posts.

12. The boat hunting blind of claim 11, wherein the second top panel support is displaceable between a second concealment position, extending from the first and second support posts toward the rear frame member, and a second shooting position, extending back over the first and second support posts.

13. A boat hunting blind, comprising:

a skirt frame having a plurality of frame members and a plurality of legs; and a plurality of springs extending between the plurality of frame members and the plurality of legs wherein the plurality of springs are adapted to assist in independently raising or lowering the plurality of frame members without handling each of the plurality of legs wherein (a) the plurality of frame members include a front frame member, a rear frame member, a right frame member and a left frame member connected together at four corners, (b) the plurality of springs extend between the plurality of legs and the four corners, and (c) each of the plurality of legs includes a center stop bracket and one spring of said plurality of springs extends between one of said four corners and one of said center stop brackets.

* * * * *